Figure 1:
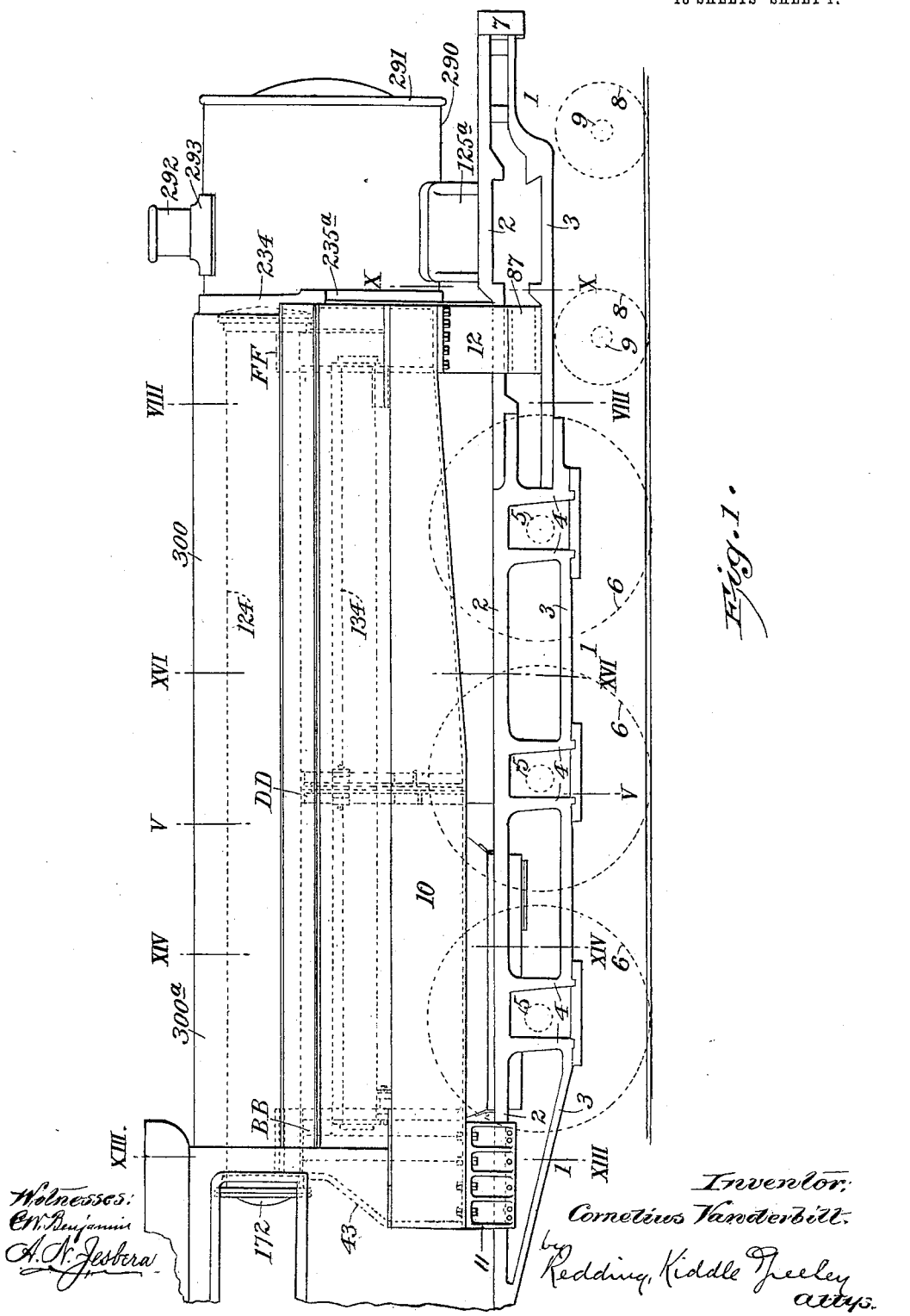

No. 823,486. PATENTED JUNE 12, 1906.
C. VANDERBILT.
BOILER.
APPLICATION FILED MAR. 3, 1902. RENEWED SEPT. 17, 1904.

18 SHEETS—SHEET 1.

No. 823,486. PATENTED JUNE 12, 1906.
C. VANDERBILT.
BOILER.
APPLICATION FILED MAR. 3, 1902. RENEWED SEPT. 17, 1904.

18 SHEETS—SHEET 4.

No. 823,486. PATENTED JUNE 12, 1906.
C. VANDERBILT.
BOILER.
APPLICATION FILED MAR. 3, 1902. RENEWED SEPT. 17, 1904.

18 SHEETS—SHEET 5.

Witnesses:
C. W. Benjamin
A. N. Jesbera

Inventor,
Cornelius Vanderbilt,
by Redding, Kiddle & Greeley
attys.

No. 823,486. PATENTED JUNE 12, 1906.
C. VANDERBILT.
BOILER.
APPLICATION FILED MAR. 3, 1902. RENEWED SEPT. 17, 1904.

18 SHEETS—SHEET 6.

Witnesses
C. W. Benjamin
A. N. Jesbera

Inventor
Cornelius Vanderbilt
by Redding, Kiddle & Greeley
attys.

No. 823,486. PATENTED JUNE 12, 1906.
C. VANDERBILT.
BOILER.
APPLICATION FILED MAR. 3, 1902. RENEWED SEPT. 17, 1904.
18 SHEETS—SHEET 8.
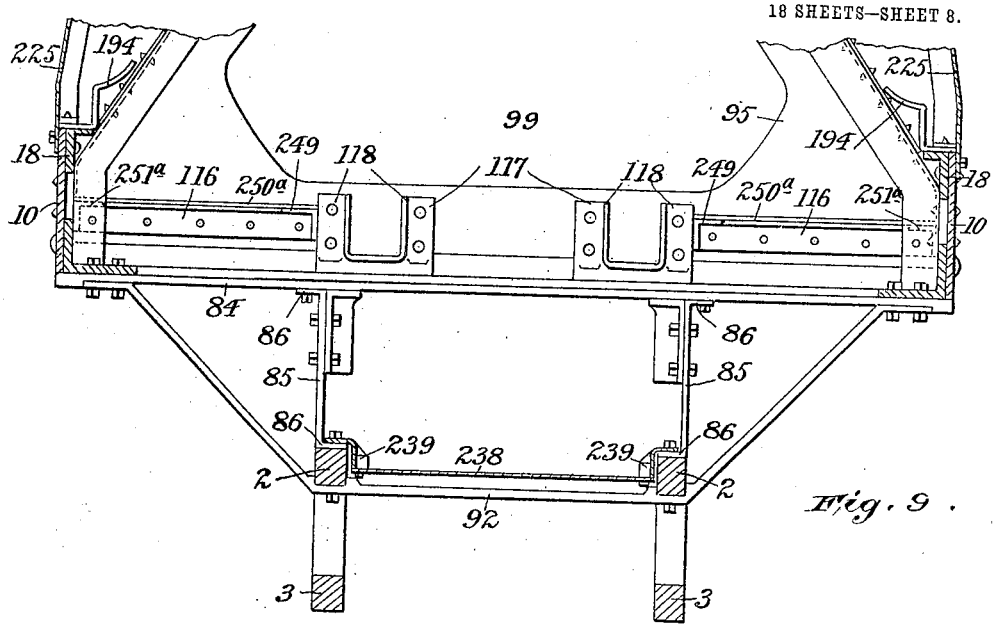
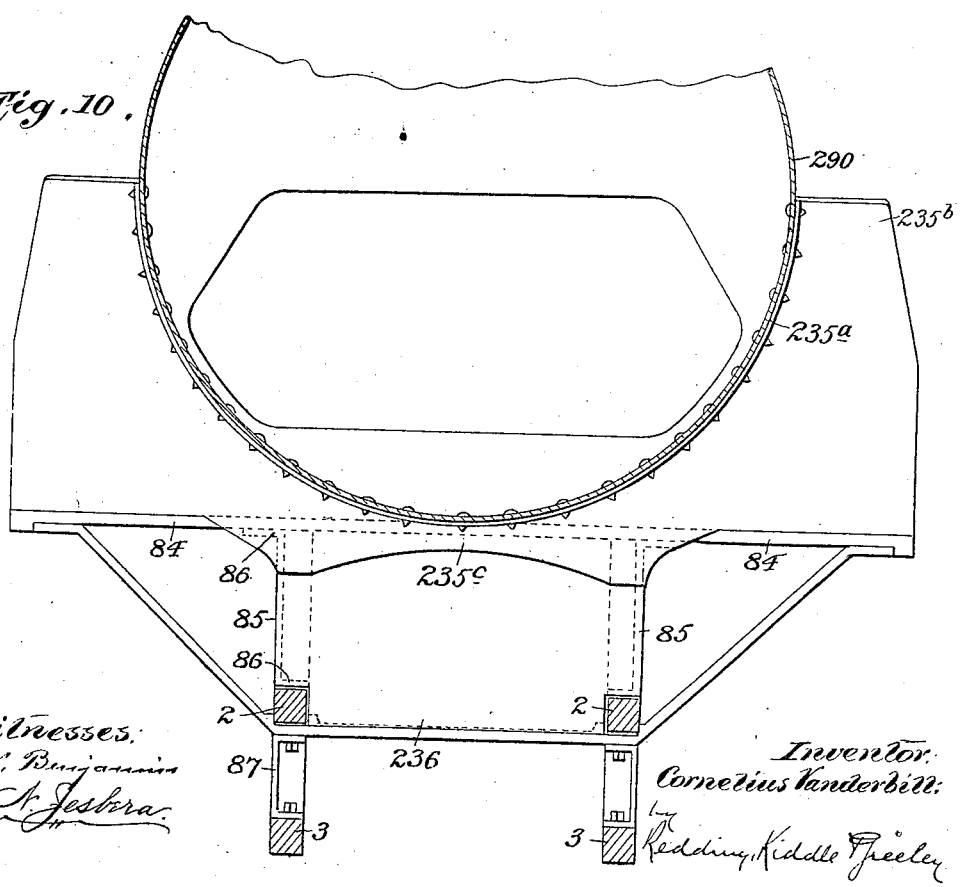
Witnesses.
Inventor.
Cornelius Vanderbilt
by Redding, Kiddle & Greeley
attys.

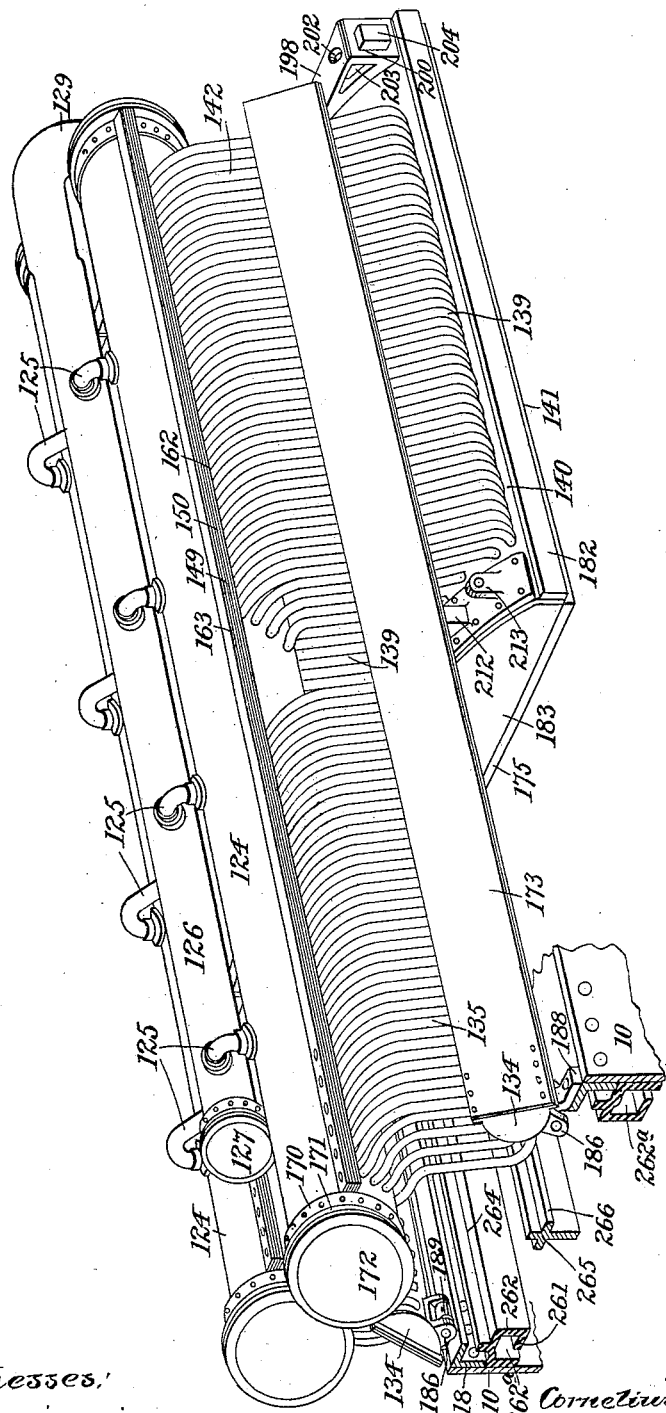

No. 823,486. PATENTED JUNE 12, 1906.
C. VANDERBILT.
BOILER.
APPLICATION FILED MAR. 3, 1902. RENEWED SEPT. 17, 1904.
18 SHEETS—SHEET 10.
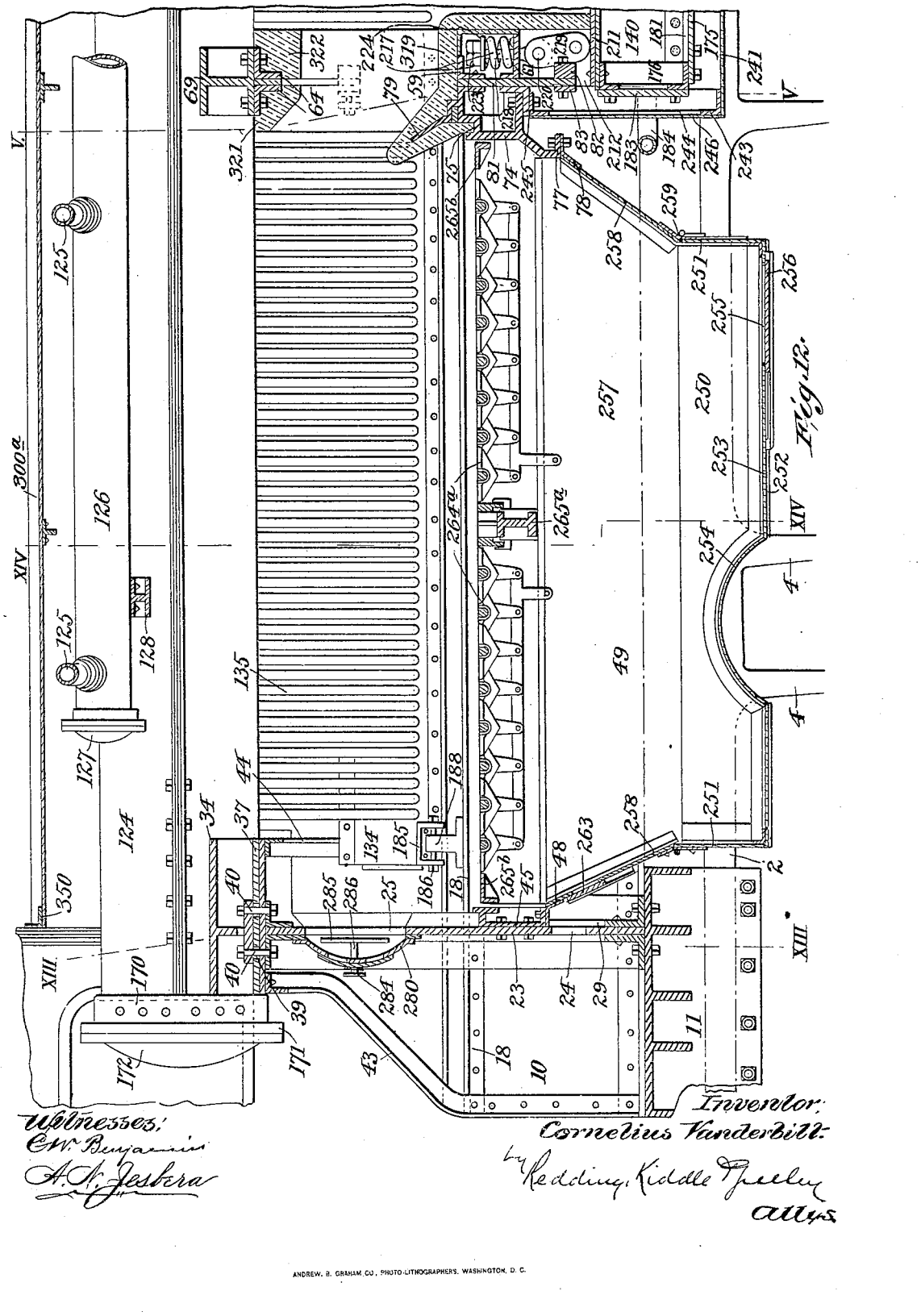
Witnesses:
G. W. Benjamin
A. N. Jesbera
Inventor:
Cornelius Vanderbilt
by Redding, Kiddle & Greeley
Attys No. 823,486. PATENTED JUNE 12, 1906.
C. VANDERBILT.
BOILER.
APPLICATION FILED MAR. 3, 1902. RENEWED SEPT. 17, 1904.
18 SHEETS—SHEET 11.
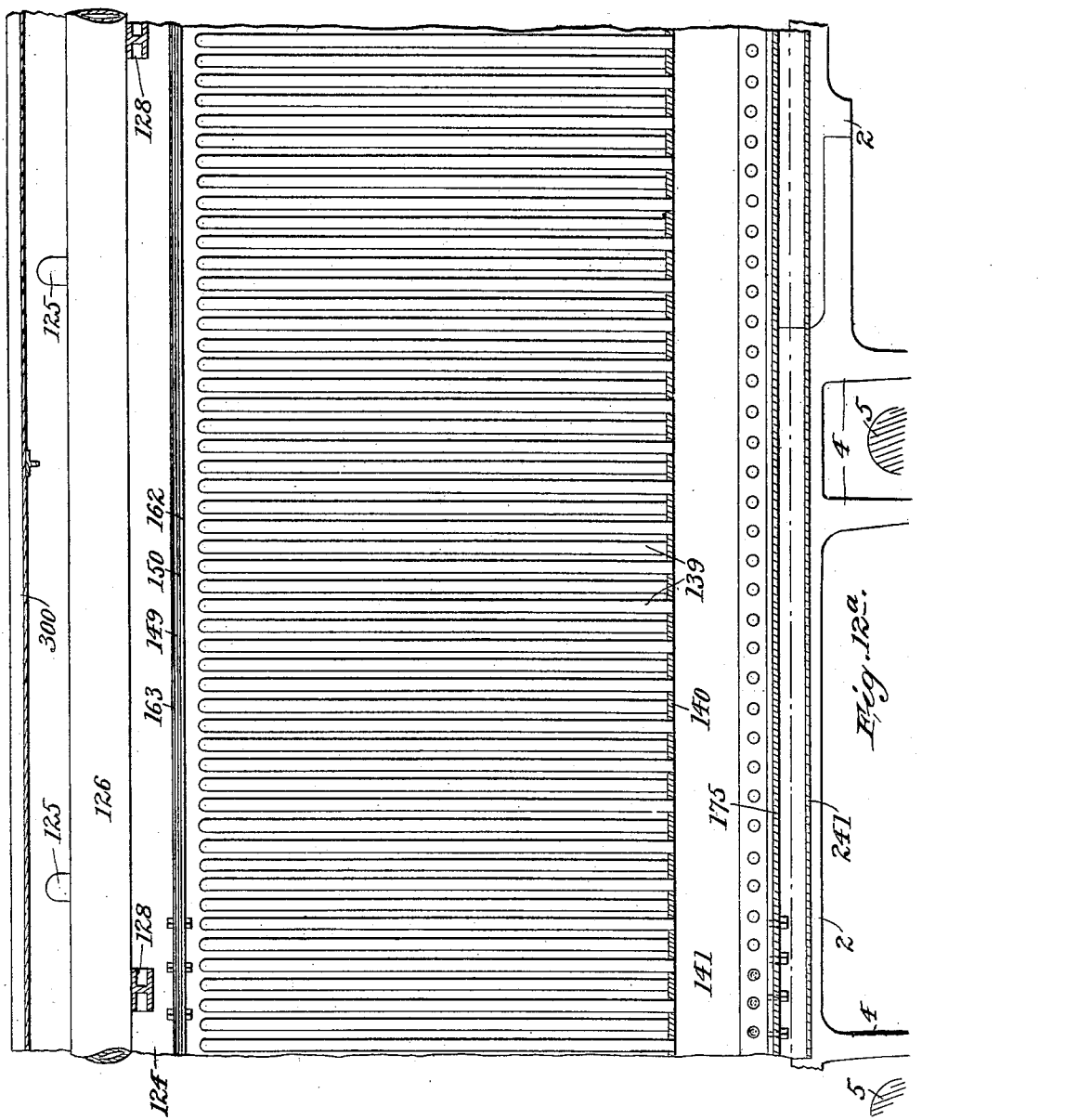

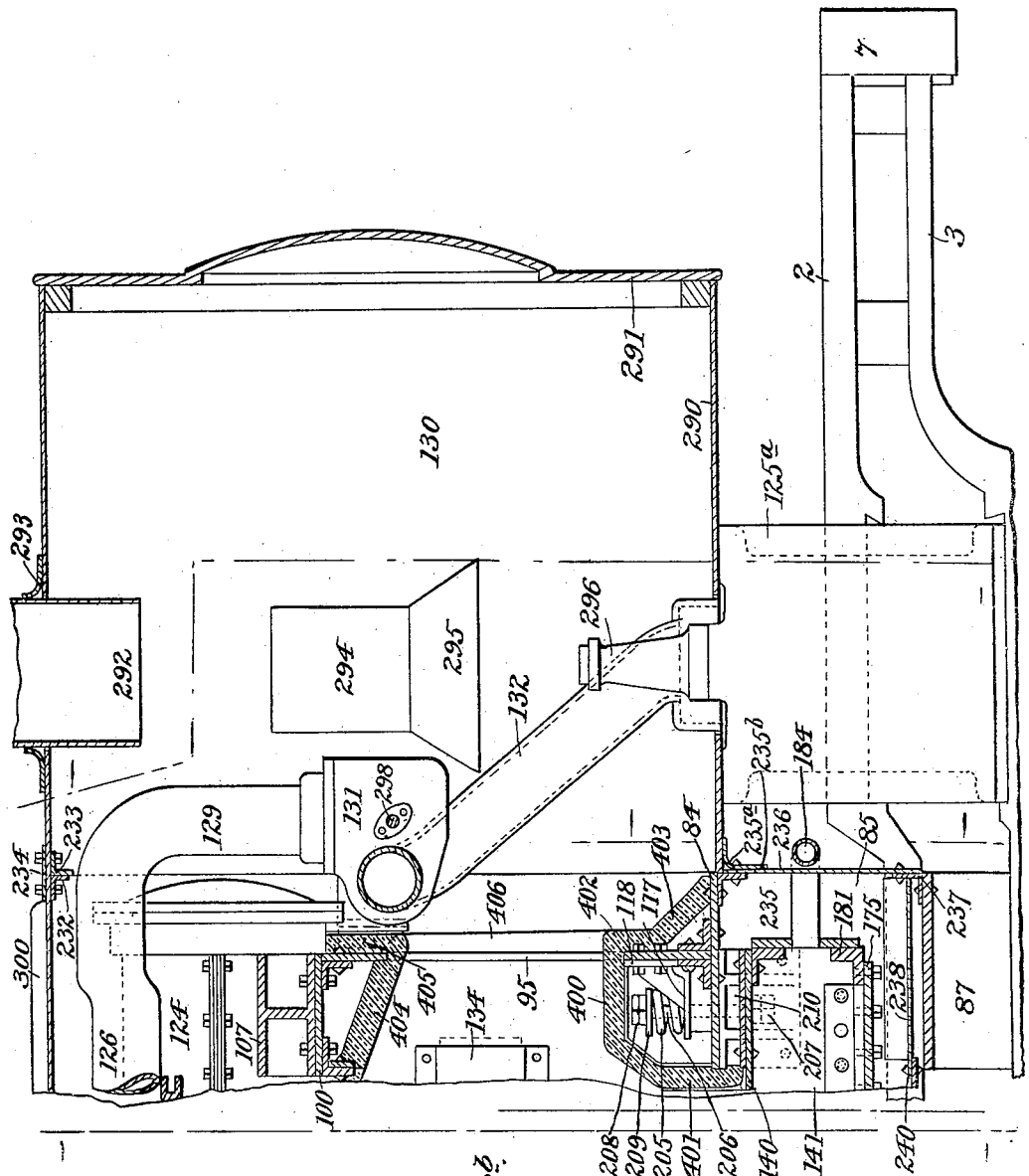

No. 823,486. PATENTED JUNE 12, 1906.
C. VANDERBILT.
BOILER.
APPLICATION FILED MAR. 3, 1902. RENEWED SEPT. 17, 1904.

18 SHEETS—SHEET 13.

Witnesses:
C. W. Benjamin
A. N. Jesbera

Inventor:
Cornelius Vanderbilt.
by Redding, Kiddle Greeley
attys gt;

Fig. 14.

No. 823,486. PATENTED JUNE 12, 1906.
C. VANDERBILT.
BOILER.
APPLICATION FILED MAR. 3, 1902. RENEWED SEPT. 17, 1904.

18 SHEETS—SHEET 15.

Witnesses:
Inventor:
Cornelius Vanderbilt
by Redding, Kiddle & Greeley
attys.

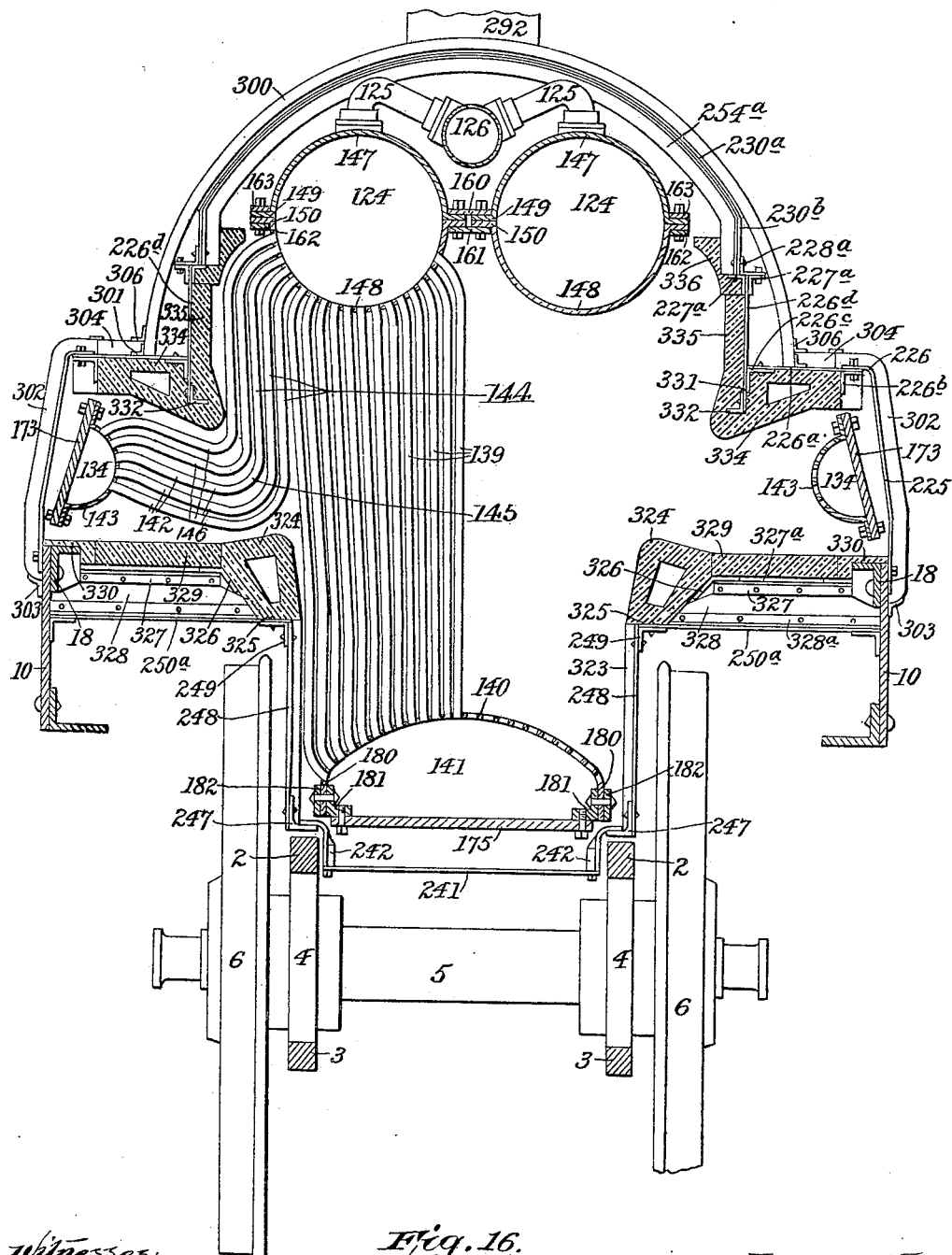

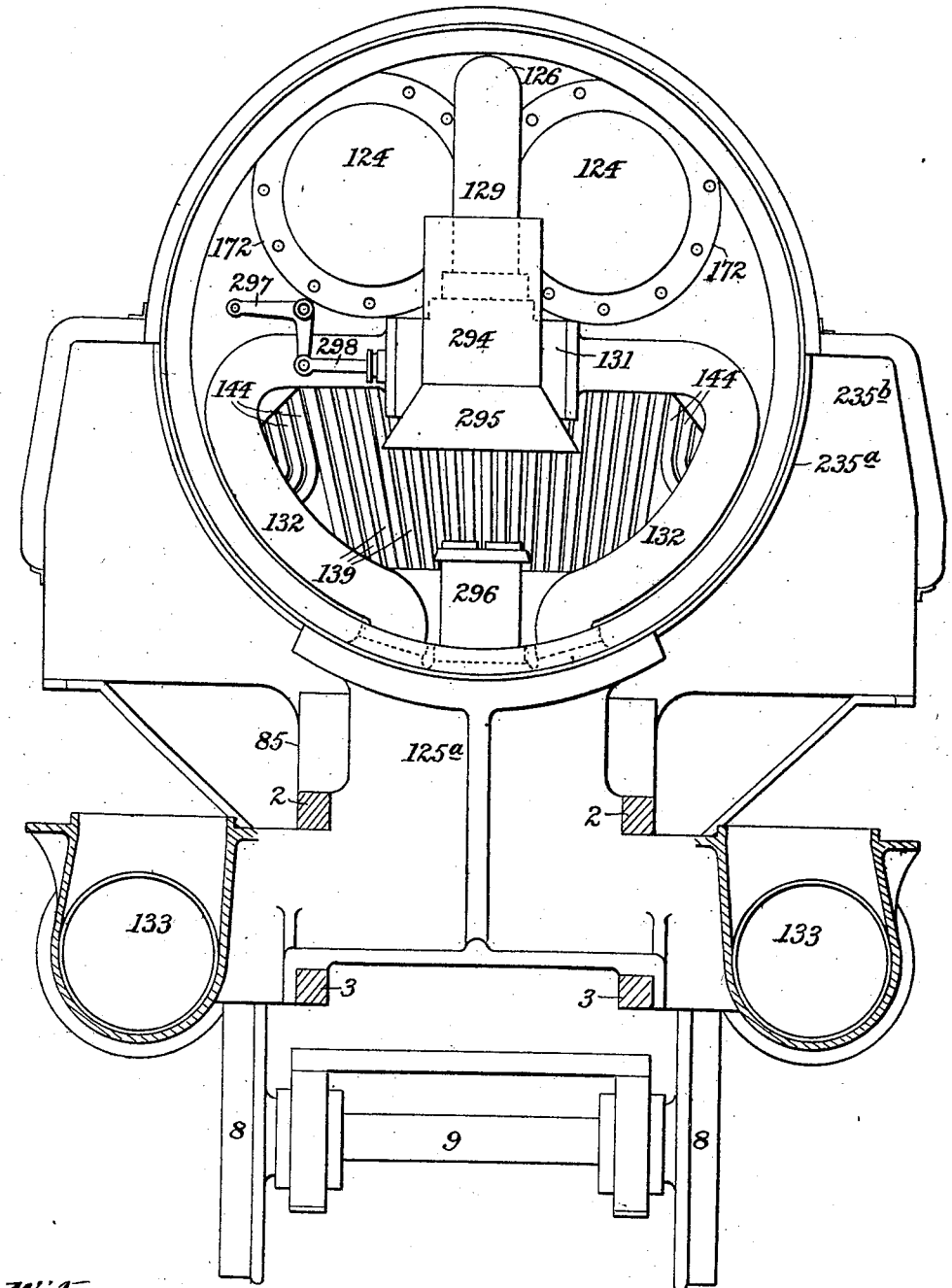

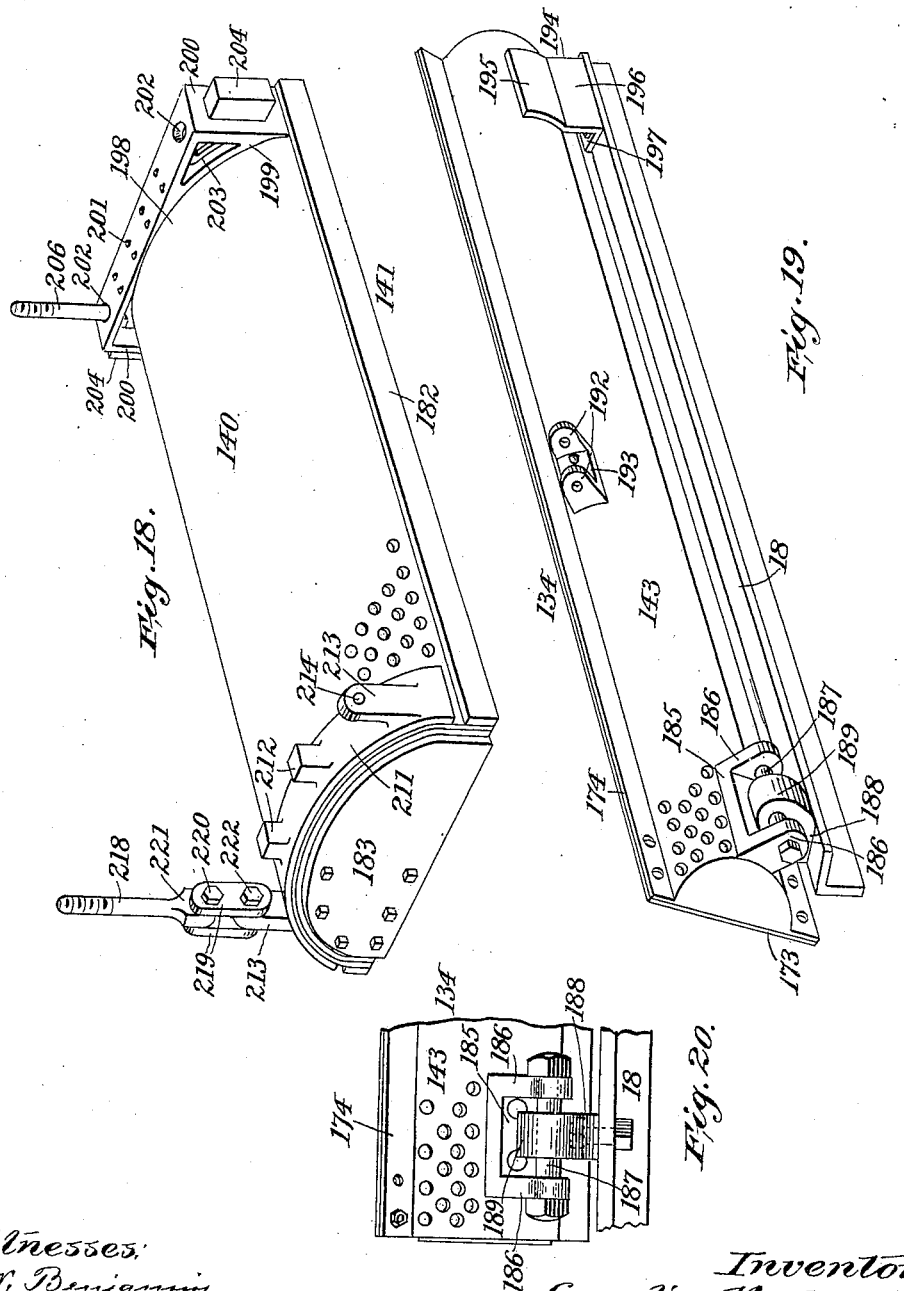

UNITED STATES PATENT OFFICE.

CORNELIUS VANDERBILT, OF NEW YORK, N. Y.

BOILER.

No. 823,486.  Specification of Letters Patent.  Patented June 12, 1906.

Original application filed December 17, 1900, Serial No. 40,182. Divided and this application filed March 3, 1902. Renewed September 17, 1904. Serial No. 224,860.

*To all whom it may concern:*

Be it known that I, CORNELIUS VANDERBILT, a citizen of the United States, residing in the borough of Manhattan, city of New York, county and State of New York, have invented certain new and useful Improvements in Boilers, of which the following is a specification, this application being a division of application Serial No. 40,182, filed December 17, 1900.

This invention relates particularly to water-tube boilers; and its objects are to improve generally the construction of such boilers, to facilitate the removal and repair of the various parts, and particularly to make it possible to obtain a greater amount of steam with a given quantity of fuel than has been possible hitherto. The boiler, moreover, is designed with especial reference to its use as a locomotive-boiler, and a further object is therefore to adapt boilers of the type mentioned above for use as locomotive-boilers.

The invention will be more fully described hereinafter with reference to the accompanying drawings, in which it is illustrated as embodied in a convenient and practical form, and in which—

Figure 2:
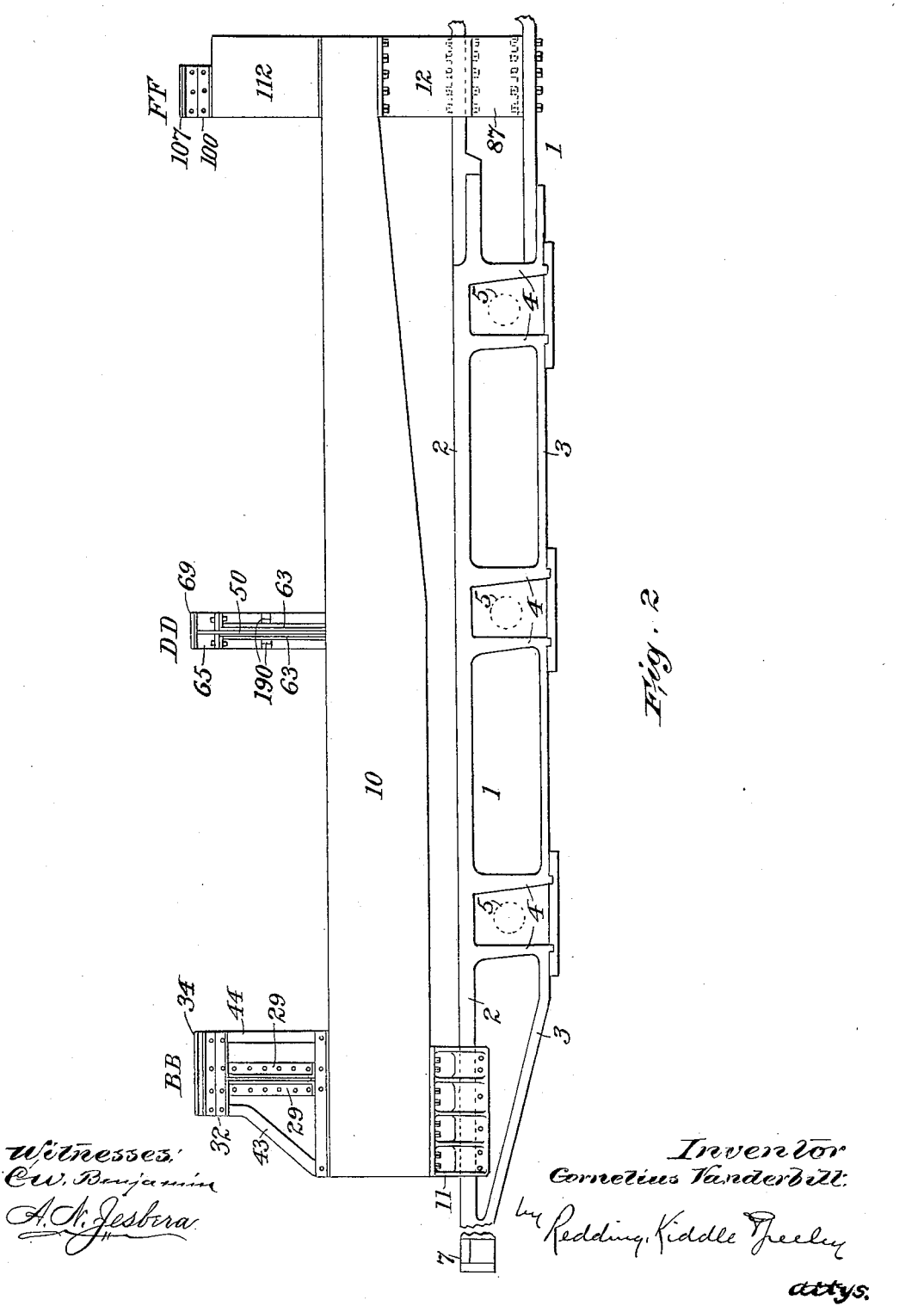
Figure 3:
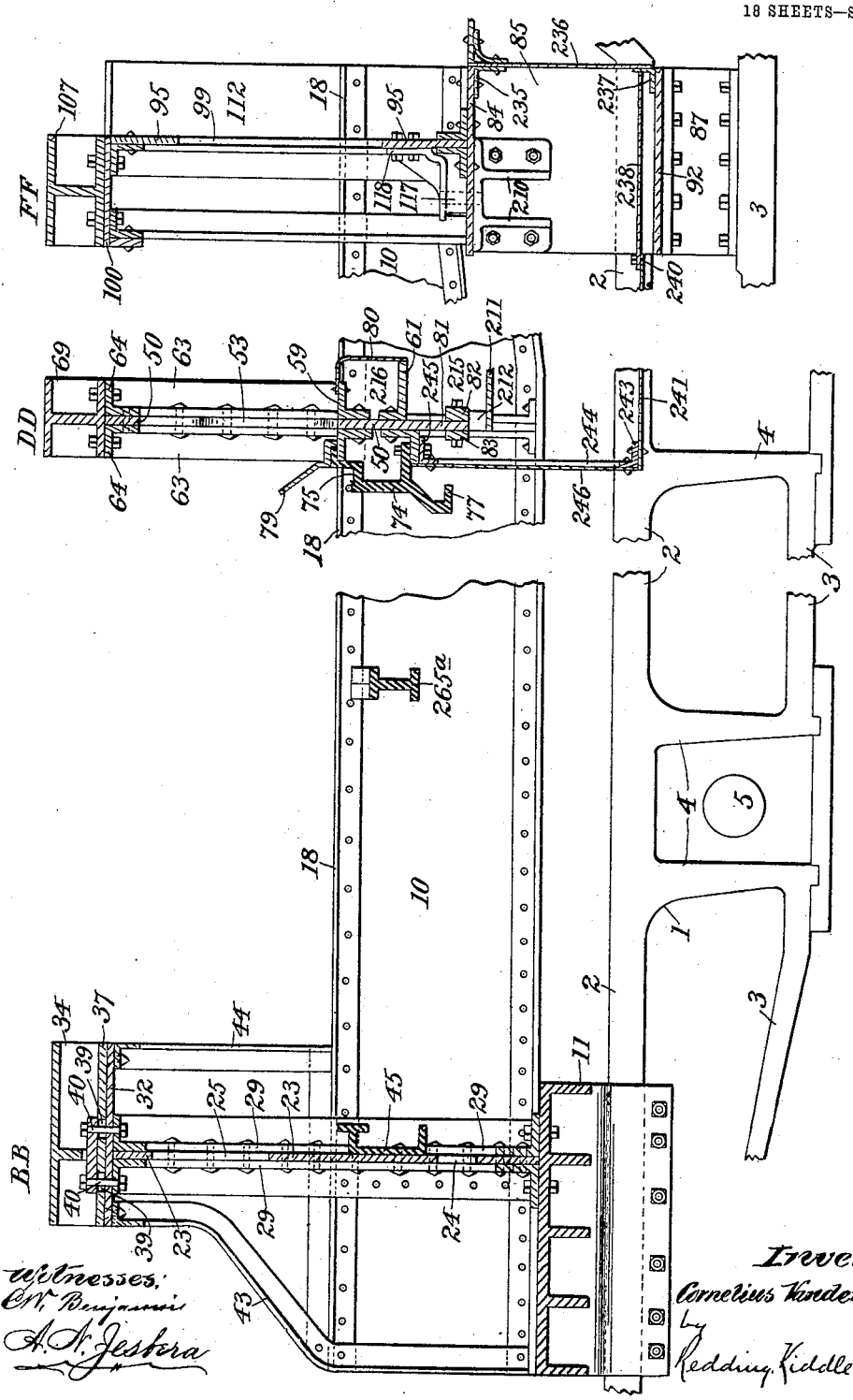
Figure 4:
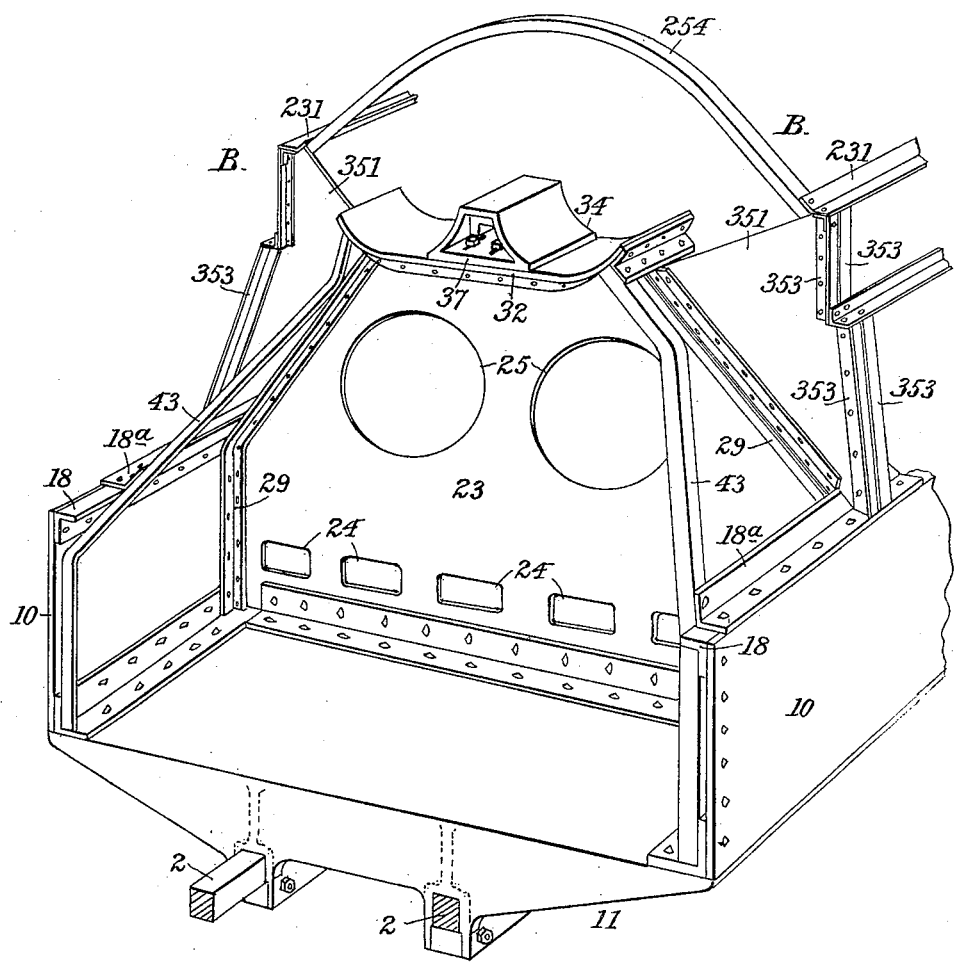
Figure 5:
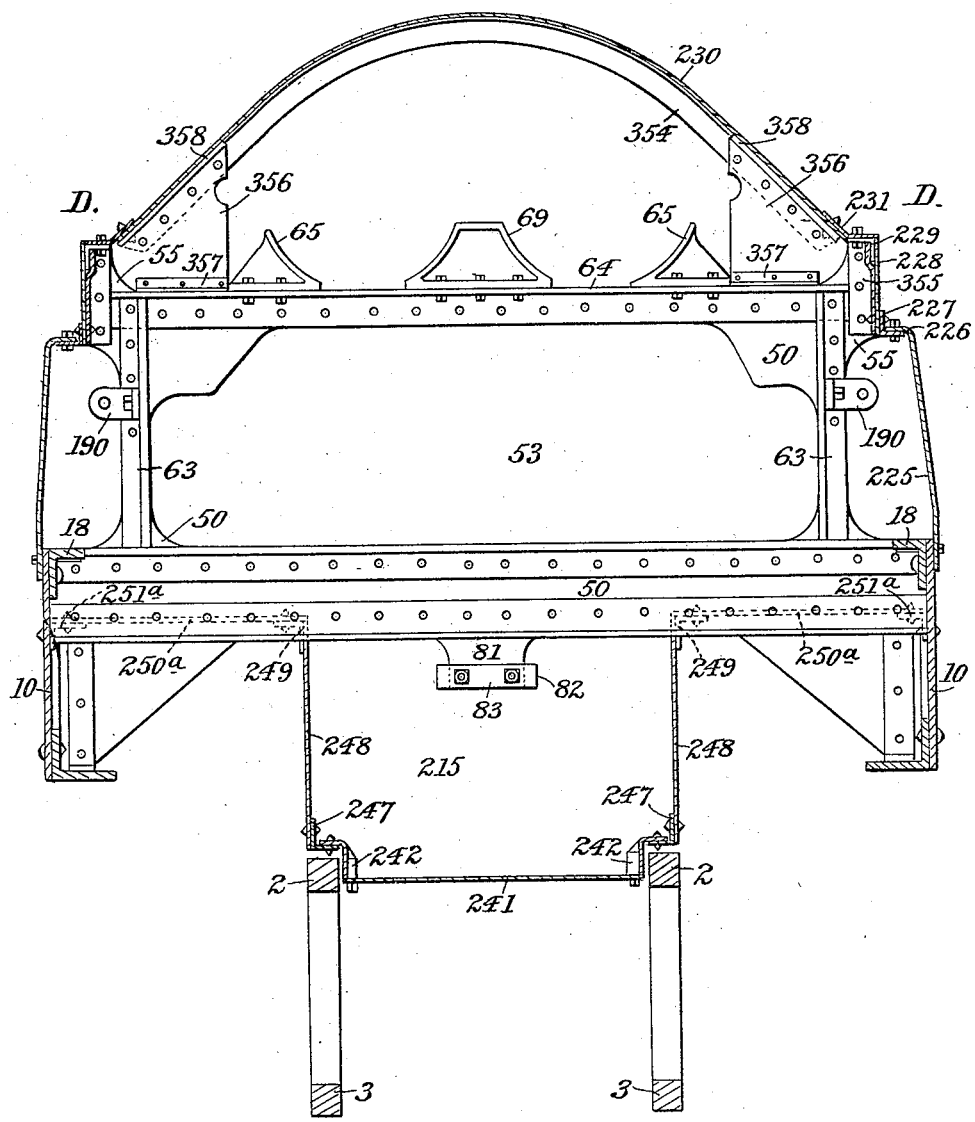
Figure 7:
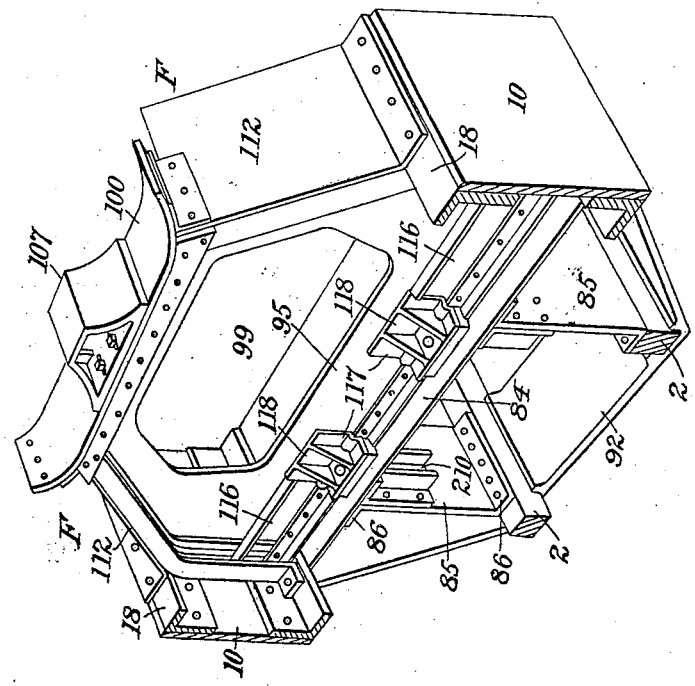
Figure 6:
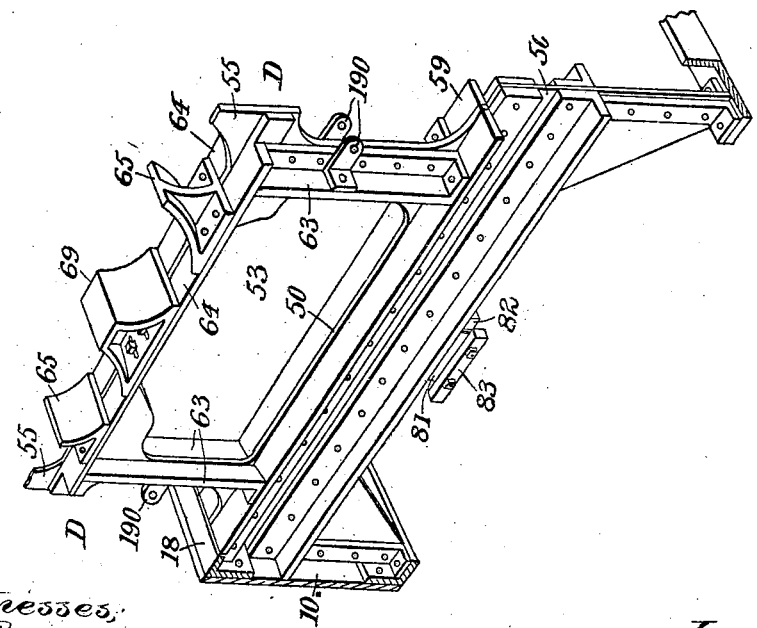
Figure 8:
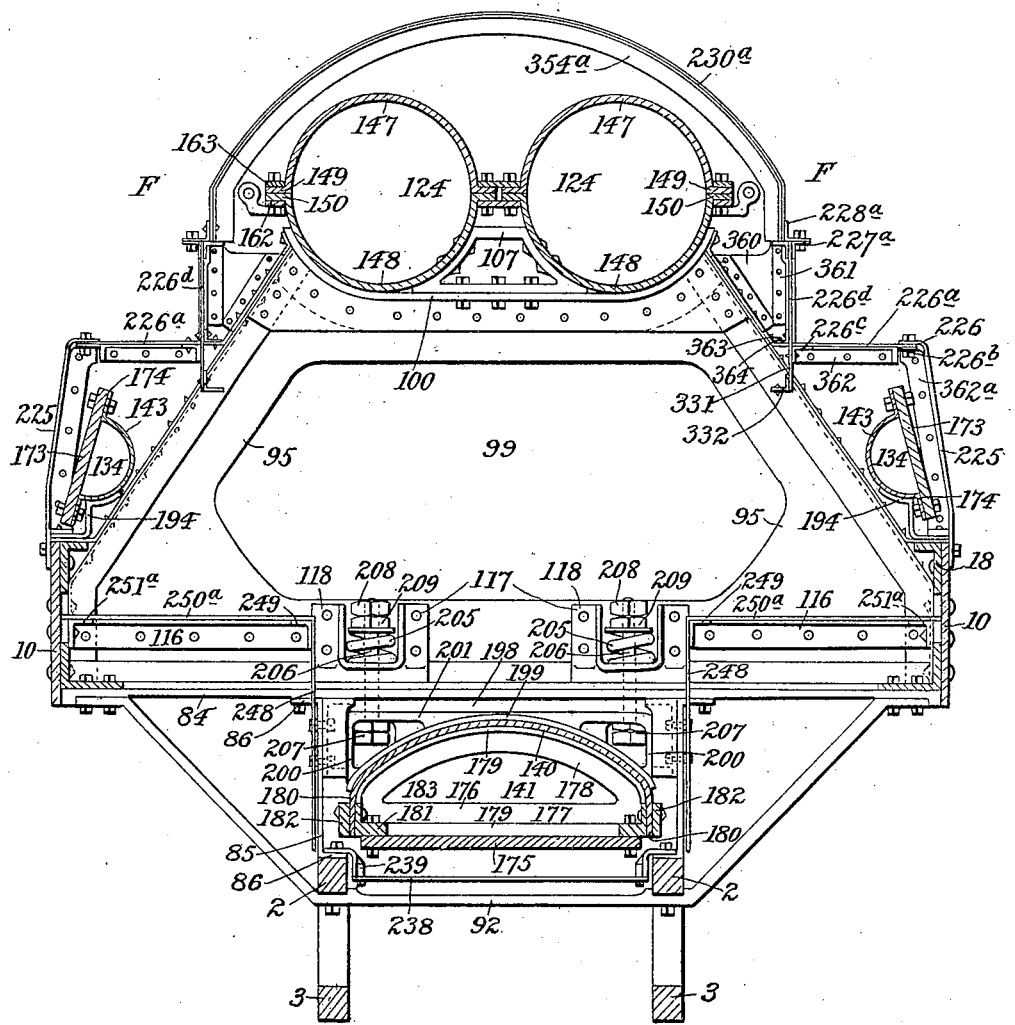
Figure 13:
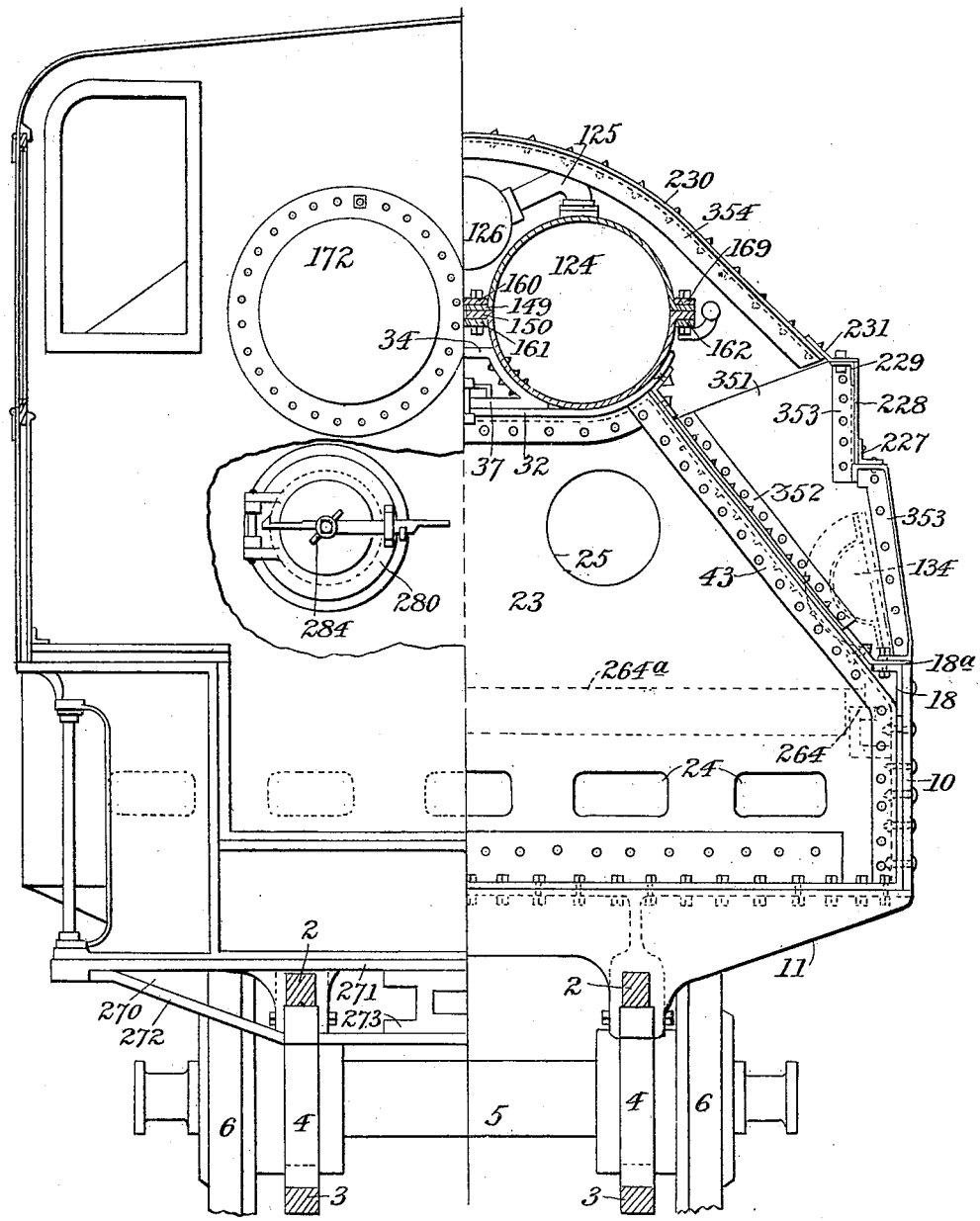
Figure 15:
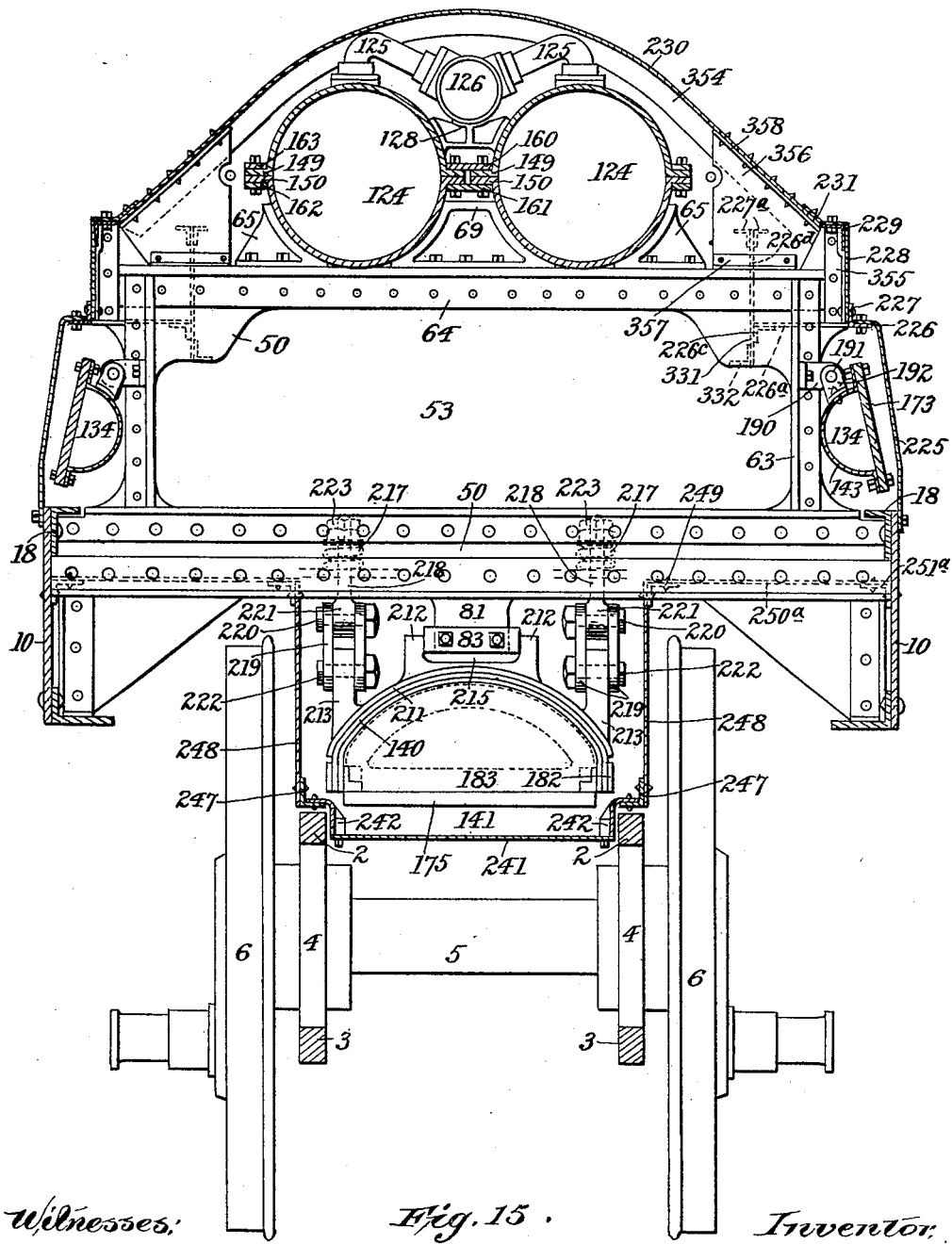

Figure 1 is a partial side elevation of a locomotive provided with the improved boiler. Fig. 2 is a side elevation of the main frame and the intermediate frame of a locomotive shown in Fig. 1. Fig. 3 is a longitudinal vertical section through the frame shown in Fig. 2, parts being broken out to save space. Fig. 4 is an enlarged perspective elevation of the rear portion of the frame shown in Figs. 2 and 3, illustrating particularly the rear strut and its appurtenances. Fig. 5 is a sectional elevation on the plane indicated by the line V V of Fig. 1, illustrating particularly the construction of the intermediate strut, the boiler being omitted. Fig. 6 is a perspective elevation of the intermediate strut. Fig. 7 is a perspective elevation of the forward strut. Fig. 8 is a section on the plane indicated by the line VIII VIII of Fig. 1 looking forward, illustrating particularly the construction of the forward strut and the relation of the main parts of the boiler thereto. Fig. 9 is a detail view in section, illustrating particularly a portion of the forward strut. Fig. 10 is a partial section on the plane indicated by the line X X of Fig. 1 looking toward the rear. Fig. 11 is a perspective elevation of the boiler, a portion of the supporting-frame being represented. Figs. 12, 12$^a$, and 12$^b$ are successive portions of a longitudinal vertical section of the boiler and its appurtenances. Fig. 13 is a view from the rear of the locomotive shown in Fig. 1, partly in section, on the plane indicated by the line XIII XIII of Fig. 1. Fig. 14 is a transverse section on the plane indicated by the line XIV XIV of Fig. 1 looking forward. Fig. 15 is a transverse section similar to Fig. 5, but with the drums and headers in position. Fig. 16 is a transverse section on the plane indicated by the line XVI XVI of Fig. 1 looking forward, the tubes at one side being omitted. Fig. 17 is a front elevation of the boiler and its appurtenances, the front cap of the smoke-box being removed and the working cylinders being shown in section. Fig. 18 is a perspective view of the intermediate header with some of its appurtenances. Fig. 19 is a perspective view of one of the side headers with some of its appurtenances. Fig. 20 is a detail view in elevation of one of the supports for the side headers.

In order that the construction of the boiler and the relation of the several parts thereof to each other and to the supports therefor may be more readily comprehended, the construction of the frame upon which in the accompanying drawings the boiler is represented as supported will be described first.

As shown in Figs. 1 and 2, the main frame upon which the boiler is supported comprises side bars 1, having upper chords 2 3 and axle-box yokes or pedestals 4 for the axles 5 of the wheels 6. The side bars 1 are tied together by cross-bars 7 of any suitable construction. The front end of the frame is supported by a pony-truck, the wheels 8 and axles 9 of which are indicated in dotted lines in Fig. 1. The intermediate frame by which the boiler is directly supported comprises two longitudinal girders 10, rigidly supported upon the main frame by chairs or castings 11 12 and tied transversely by three struts, one, F F, at the extreme forward end, an intermediate strut D D just forward of the fire-box section, and a rear strut B B just forward of the rear ends of the girders. The intermediate frame is held rigidly to the main frame at its end by the chair 12 and by its connection with the cylinder-casting through the cylindrical smoke-box hereinafter referred to. Both chairs 11 and 12 are rigidly secured to the chords of the main frame.

The rear strut B B, Figs. 2, 3, and 4, is built up of the central compression web 23, strengthened and stayed by suitable angle-irons and supports at its top a cradle for the two drums of the boiler hereinafter to be referred to, such cradle comprising a flat plate 32, curved upwardly at its ends, and an intermediate chair or casting 34, the base 37 of which is provided with longitudinal apertures 39 for the bolts 40, by which the chair is secured to the plate 32, so that it may move thereon longitudinally. The strut D D, Figs. 2, 3, 5, and 6, likewise comprises a central or compression plate 50, strengthened and stayed by suitable angle-irons and having an aperture 53 for the passage of the products of combustion. This strut is supported upon and secured to the side girders 10 and itself supports cradles for the boiler-drums, such cradles comprising end chairs 65 and a central chair 69, which is also adapted for longitudinal movement as described with reference to the central chair of the strut B B.

The strut F F, Figs. 2, 3, 7, 8, and 9, comprises a base-plate 84, secured to the side girders 10, plate-posts 85, and a plate or casting 87, the latter with the plates 85 forming the chair 12. The main compression-plate 95 of this strut rests upon the base-plate 84 and is firmly secured thereto. It is formed with an aperture 99 for the passage of the products of combustion, and at its top supports the cradle base-plate 100, the ends of which are curved upwardly. A central chair 107 is secured to the base-plate by bolts which pass through transverse slots in the lower web to allow of lateral movement.

In the organization of the boiler and its supports particular attention is paid to the location of the various parts with reference to the fire-box section, the intermediate section, and the smoke-box section of a locomotive, each bearing a certain predetermined coöperative relationship to such sections, as will be hereinafter pointed out.

The generator comprises a pair of longitudinal drums, side headers located transversely farther apart than the two upper drums and at a lower level, both drums and the side headers having substantially the same longitudinal extension, and a lower or intermediate header located below the plane of the side headers and centrally. The upper drums 124, Fig. 11, find their support on the struts B B, D D, and F F, the intermediate frame directly supporting them and their appurtenant weight. They are preferably secured rigidly to the front strut and flexibly to the rear and central struts to allow of relative movement. The steam-space of the drums is connected by a series of short pipe-sections 125 with a cylindrical dry-pipe 126, closed at the rear end by a cap 127 and supported between the drums on chairs 128, as shown in Figs. 12ª, 12ᵇ, and 15, which rest between and on the drums. The front end 129 of the dry-pipe extends into the smoke-box 130 and downwardly to the throttle-box 131, from which extend the branch pipes 132 to the cylinders 133, as shown in Fig. 17. As is customary in locomotive practice the front end of the frames and the cylindrical smoke-box section are secured together by casting 125ª, which is the same as is usually provided for this purpose.

The side headers 134 terminate substantially within and at the front of the rear strut B B, Fig. 12, and are connected, respectively, with the lower half of the corresponding drums at one side of the vertical axis thereof, Fig. 14, and to the rear of the strut D D, or, in other words, within the precincts of the fire-box by a gang of water-tubes 135, disposed in reverse-curve form and having horizontal outwardly-extending sections 136, vertical sections 137, and lower and outer ends 138, Fig. 14, converging to the side headers 134, the upper ends 136 entering the lower half of the corresponding drum, and all being located substantially away from or outside of the opening 53 through the strut D D. The tubes may be in vertical and horizontal series or in banks not so regularly placed. Although this is the preferred disposition of tubes between the upper and side drums, it is apparent that the same may be varied to suit other conditions of service and construction without departing from the spirit of the invention.

Immediately forward of the central strut D D the boiler-tubes are not only arranged in vertical and horizontal series or banks, but have a twofold or duplex disposition.

By reference to Figs. 14 and 16 it will be noted that the tubes 139, extending between the lower half of each upper drum 124 and the tube-sheet 140 of the lower intermediate header 141, are substantially straight up and down and form a bank immediately in front of the opening 53 through the strut D D to at once engage the products of combustion as they pass from the fire-box through the opening in the strut D D to the smoke-box and (see Fig. 16 particularly) that the disposition of the tubes 142 between the lower half of each drum 124 and the tube-sheets 143 of the side headers 134 is the reverse of the tubes 135, in that they drop down, (144, Fig. 16,) form a head 145 in front of the opening 53, and then extend outwardly (146) to the tube-sheet 143.

The arrangement of tubes, drums, and headers, as will be seen by reference to Figs. 14 and 16, substantially fills up transversely and longitudinally the entire channel which is formed for the passage of the products of combustion between the struts D D and F F, thereby practically filling up the entire central or intermediate section of the locomotive with water-tubes adapted to be directly engaged by the products of combustion. An important feature of the invention in this connection relates to the specific location of lower intermediate header 141 between the fire-box section and the smoke-box section of the locomotive and with relation to the frame slightly above the main frame and below the plane of the top of the driving-wheels—that is to say, the exact location of the lower header relative to the frame and driving-wheels is not the essential feature—the requirements in this regard being the lowering of this header, so as to get as close to the center of gravity as possible. The utilization of the space between the fore part (or smoke-box) of the locomotive and the front of the fire-box both longitudinally and transversely by a header gives considerable longitudinal and transverse extension, which is also an important feature of the invention.

The construction of the drums and headers will now be described.

By reference to Figs. 14 and 16 it will be noted that each drum comprises two semi-cylindrical parts 147 148, the latter being the tube-sheet. Each part is provided with outwardly-extending flanges 149 150, the inner flanges of the two drums being connected by plates 160 161, running the length of the drums, the plates being on the outside of the flanges, and bolts passing through both the plates and the flanges to rigidly connect both parts of each drum, as well as the completed drums. The outer flanges of each drum are likewise secured together by longitudinally-disposed plates 162 163, through which bolts pass. The drum-sections are thus not only firmly united together, but both drums are united into one single element structurally and at the same time (the flanges being horizontally disposed) this construction permits the upper drum-sections, dry-pipe, and connections to be readily removed to repair or replace the tubes and to secure the parts together.

The rear end of each drum is closed by a cap formed by the flange-ring 170, riveted to the drum, the cap-piece 172, Fig. 12, being bolted to the lateral flange 171 of the ring.

The lower half or tube sheet of each drum (the drums being divided horizontally instead of vertically, so as to the better resist expanding strains, and also to permit the connection of the tubes thereto to be more readily effected) is provided with apertures through which the ends of the tubes extend, the ends of the tubes being expanded in these apertures by any suitable tool. The horizontal division of the drums further allows of the removal, as before stated, of the dry-pipe, its connecting-tubes, and the upper sections of the drums by simply removing the bolts and the plates between the drum-sections.

Each side header 134 comprises a flat back plate 173, Figs. 8, 11, &c., and a curved front plate or tube-sheet 143, having outwardly-extending flanges 174, bolted to the back plate and provided with apertures to receive the tubes which may be expanded therein. The bolting of the plates to the tube-sheets from the outside and the location of the side headers outside of the struts enables the tubes to be readily reached for repair or replacement. The ends of the side headers are formed the same as those of the lower intermediate header, to be described. These side headers are located as to their vertical planes between the drums and the lower intermediate header, and transversely they are located outside of the struts D D and F F, which they pass, Figs. 8 and 15, being inclined inwardly to facilitate getting at the several parts. This lateral disposition of the side headers, together with the drop of the lower intermediate header, also greatly increases the tube-heating surface. This feature illustrates one of the marked advantages and novel characteristics involved in the adaptation of a water-tube boiler for locomotive purposes.

The lower header 141, Figs. 8, 12$^a$, 15, 16, and 18, comprises a longitudinal base-piece 175, interior ribs 176, having a cross-bar 177, and a curved crown-piece 178, provided with horizontal flanges 179, and a curved and perforated tube-sheet 140, having depending sides 180 abutted against the outside of the vertical flange of the angle-irons 181. The depending sides 180 are interposed between said vertical flanges and outside straps 182, running longitudinally of the header, as shown in Figs. 8 and 16, both the strap and tube-sheet sides and the vertical flanges of the angle-irons being riveted together to form a base to which the plate 175 is detachably bolted to allow access to the tubes. To each extreme rib 176 is secured an end plate 183, which completes the header, each end plate having a blow-off pipe 184, Figs. 12 and 12$^b$. Instead of employing the ribbing, however, the staying of the header can be accomplished by a construction in which the ends of the header are closed by a sheet riveted in the side flanges, side plates, and crown-piece, being rigidly held together by transverse stays passing through the flanges, plate, and crown-sheet ends and provided with heads and nuts to firmly secure and tie the parts together.

In the boiler the maximum heat will probably be developed at or near the brick arch, (to be described,) and the heat at the ends of the boiler—that is, at the smoke-box and at the end at which the cab is located—will probably be less. This would indicate that the circulation in the boiler would be upward at the fire-brick arch and downward at both ends of the boiler, making a double circulation, although at times it may have a circulation vertically divided, the movement being up on one side and down on the other. However, so much is dependent upon the rate of evaporation per square foot of heating-surface and the number of pounds of water evaporated per pound of coal, which fixes the maximum point of temperature, that in a construction of this kind the exact location and direction of the circulation is best determined for a distinct class of coal by means of boiler test.

To furnish air for combustion, holes 24, Figs. 4 and 12, are cut through the web-plate of the support B B about nine or ten inches above the casting. The air which is supplied beneath the fire passes through the holes and through the dampers in the ash-pan to the under side of the grate. The air which is admitted over the grate passes through the fire-doors or dampers, which may be placed in the fire-doors and are not shown in the drawings.

The course of the products of combustion is over the fire-brick arch through the opening in the second strut or support, the iron plate of which is protected by fire-brick, (and preferably a little asbestos lagging between the fire-brick and the plate,) between the tubes which connect the bottom or central header with the drums, and also at the sides between the tubes from the side headers. The spacing of the tubes is such that at the center where the exhaust of the engine would naturally produce the greater draft the tubes are placed close together, and at the sides where the draft may be expected to be less the tubes are placed farther apart with the intention of equalizing as far as possible and spreading out to the greatest extent practicable the products of combustion, so that all of the heat developed by the coal may be utilized for the production of steam. The water must be fed to the boiler at such a place that it does not interfere with the free circulation of the water. This may be accomplished by feeding at either end of the drums or at either end of the headers or centrally in the top drum at the location of the center strut if the temperature at this point permits.

The means for supporting the boiler and its associated parts on the intermediate frame are as follows: The upper drums are rigidly secured to the front strut F F; but the connection of the drums to the rear strut B B and intermediate strut D D is a flexible or adjustable one, so as to allow of longitudinal expansion or contraction of the drums on the intermediate frame or a throw of the same when rounding curves without subjecting the drums to strain and also to allow of longitudinal expansion and contraction of the parts of the intermediate frame at the fire-box and independently of the drums and without involving them. The lower halves or sections of the drums are riveted to the curved sections of the drum-chairs, as indicated in Fig. 13, longitudinal slots in the base of the chair on the rear strut B B and apertures in the vertical web thereof permitting longitudinal movement between the chair and the cradle base-plate of the strut independently of each other, the plate and the bolts tying the parts together against vertical movement relatively to each other. The side headers 134 are supported at three points along their length. To provide against straining the tubes 135 142 longitudinally and loosening their connection with the drums and headers (the expansion and contraction of the tubes being taken up by their bends) and to allow the headers, drums, and tubes to move conjointly or simultaneously forward or rearward on contraction or expansion and also to firmly hang or support the side headers and relieve the tubes of all strains therefrom, each of the said headers is supported at the rear end by means of a knuckle-joint, at the forward end by a chair, and at an intermediate point by a knuckle-joint connection. The rear support, Figs. 12 and 19, it will be noted, is located at the extreme rear end of the header and at the end of the fire-box closely adjacent the strut B B and comprises a head or knuckle 185, firmly riveted or secured to the tube-sheet 143 of the header below and free from the tubes. Between the arms 186 of the knuckle extends a headed pin 187, and firmly secured to the inwardly-extending horizontal flange of the upper girder angle-iron 18 of the frame is a bar 188, having an upturned and apertured head 189, through which the bolt 187 passes, the bolt being adapted to move longitudinally through said head. The intermediate support is secured to the side uprights of the intermediate strut D D and comprises outwardly-extending bars 190, Fig. 15, having bent ends secured to the angle-iron 63, their outer ends being apertured to receive a bolt 191, the outer ends of which are secured to the arms 192 of a knuckle 193, Fig. 19, riveted to the tube-sheet 142 of the header. Referring to Figs. 9 and 19, it will be noted that the front support 194 comprises a plate forming a chair, having an upper curved arm 195 riveted to and conforming to the curve of the header tube-sheet, a vertical arm 196, and an outwardly-bent lower arm 197, riveted to the inwardly-projected horizontal flange of the upper girder angle-iron 18 of the frame. In this way provision is made for permitting both the side headers, the drums, and the tubes extending between them to move in unison with each other longitudinally to a limited extent and independently of the intermediate frame. Provision is also made for flexibly supporting the lower or bottom header 141 upon the intermediate frame, so as to allow for expansion or contraction of the tubes connecting this header with the drums without subjecting them to strain, at the same time firmly supporting the header, and, further, to allow of the longitudinal movement of either the header or its bank of tubes conjointly with or independently (within limited extent, however) of the drums and upper ends of the tubes. To accomplish this result and further prevent any transverse movement of the header bodily or a longitudinal movement of the front part of the header, a three-part support is provided. At the forward end of the header 141 is provided a cross-head 198, (see Fig. 18,) which is adapted to engage the forward strut to allow vertical movement of the drum while restraining it from bodily longitudinal movement, this end of the header being supported by spring-links adapted to permit of a vertical movement only for vertical expansion or contraction of the tubes, while at the rear end of the header is provided an articulated link-support with an intermediate guide, allowing of a vertical movement or slight swing of the header relative to the intermediate frame while restraining transverse movement. This arrangement is as follows: The forward cross-head 198 comprises a casting having a curved under flange 199, made to conform to the curve of the tube-sheet 140 of the header, vertical side arms 200, and a horizontal top bar 201, the curved flange 199 resting upon the header and being riveted to it and the flange 179 of the inside ribbing frame, as shown in Figs. 12$^b$ and 8. The top bar 201 of the cross-head is apertured at 202, and these apertures, located adjacent to side arms 200 of the cross-head, lead into recesses 203. From the side arms 200 extend outwardly squared guide-heads 204. To the compression-plate 95 of the forward strut F F and in line with the openings 202 in the cross-head 198 when the parts are assembled are affixed spring-seats 117, as shown in Fig. 8. These seats are adapted to carry coil-springs 205 or other forms of resilient connections, and upon these springs bolts 206 bear. These bolts pass through the springs and through the holes formed in the spring-seat, the base-plate of the strut, and the holes in the cross-head, the heads 207 of the bolts lying in the recesses of the cross-head and directly supporting it and the header at this end. Below the adjusting-nuts 208 of the bolts lying within the spring-seat are spring caps or plates 209. Secured to the upright arms or king-posts 85 of the strut F F are guide-castings having side plates and intermediate grooves 210, Fig. 3, with which grooves the guide-heads 204 of the cross-head are adapted to engage. By this construction the header at this end is permitted to have a movement up and down against the stress of the suspending-springs to allow for expansion and contraction of the tubes, while longitudinal or transverse movement of the header is restrained.

At the rear end of the header is provided an arched plate 211, Figs. 15 and 18, riveted to the tube-sheet 140 of the header and conforming to its curve, from which plate extend upwardly two lugs 212, located adjacent to the longitudinal center of the header, and at the sides of said plate and extending upwardly are two lugs or bars 213, having transverse apertures 214. The compression-plate 50 of the strut D D has a pendent projection 81, Figs. 5, 6, and 15, and the bottom of this projection is provided with bars 82 83, both rigidly bolted to the projeection, which bars increase the transverse thickness of the projection at this point to form a guide or restraining head 215. The compression-plate 50 of this strut is also provided with an outwardly-extending angle-iron 61, Fig. 3, which, together with the angle-iron 59, located directly above it, and the sheathing 80, (upon which fire-brick is located,) forms a housing 216 for the coil suspension-springs 217. (Shown in Fig. 12.) The horizontal web of the lower angle-iron is provided at each end with an aperture, and through these apertures extend the upper sections 218 of the toggle-links or hangers, the lower link comprising the paired plates 219, pivotally secured by bolts 220 to the apertured eye 221 of the upper link 218 and by bolts 222 to the eye of the lug 213, extending from the plate 211, the plate being rigidly affixed to the tube-sheet of the header. Each upper link 218, where it extends through the angle-iron 61 into the housing 216, is surrounded by a coil or other form of spring 217 and has adjusting-nuts 223 and a spring-cap 224 bearing upon the top of the spring. These spring-links are so located that when the parts are assembled the pendent projections 81 from the compression web or plate of the strut D D will extend into the space between the lugs 212 on the plate 211, Fig. 15, the enlarged head 215 of said projection engaging at the side with the sides of the lugs, so as to form a restraining-guide for the header. By this arrangement the forward end of the header, the rear end of the header, and the tubes connected therewith may have a longitudinal movement conjointly with the drums, the side headers, and their connecting-tubes and independently of the intermediate frame to allow of expansion or contraction, which movement is limited by the amount of compression allowed the springs 217 and the movement at the articulation of the links, while the springs themselves, conjointly with the springs 205, resiliently support the header and the weight of the tubes connected therewith, so as to relieve said tubes and header of any strain tending to produce bad joints or rupture.

Through the foregoing arrangement means are provided for supporting the boiler in a stable and efficient manner, while preserving ample accommodations for expansion or contraction of the parts thereof and permitting a deflection between the boiler and the intermediate frame on rounding curves without impairing its support, all of the beneficial attributes of a water-tube boiler or water-circulating generator are obtained, and in addition the beneficial results flowing from the novel construction of the boiler illustrated and described herein in its coöperative relationship with the various fundamental parts of a locomotive structure and the means for carrying the boiler permit the utilization of all the desirable qualities and characteristics of a boiler of this kind in a locomotive, the boiler being firmly and stably supported upon the main frame of the locomotive, which latter, in addition to supporting the weight and stress of the superposed frame and boiler and other appurtenances, has only to perform the functions of a frame in carrying and maintaining the parallelism of the axles and their adjuncts.

Another feature of improvement, although not essential, yet highly desirable, is the framework or superstructure adapted to carry the lagging and a part of the exterior finish of the locomotive, including the cab-section and the smoke-box section.

The sheathing as to its main body takes the form shown generally in section in Fig. 14 and comprises side pieces 225, extending along between the cab - section and the smoke-box section, Fig. 1, and secured at their lower sides to the side plates and the side girders 10. The lower sheathing-plates have inwardly-bent upper edges 226, to which are secured angle-irons 227, Fig. 13, and from these angle-irons rise vertical side plates 228, having angle-irons 229 secured to their upper edges. Between the angle-irons 229 extends the crown-piece 230 for supporting the top lagging 300, the edges of the crown-sheet being connected to the angle-irons 229 by angle lapped plates 231. The above-described sheathing extends in this particular form only over the fire-box section, that over the intermediate section, as shown in Fig. 8, involving substantially the same lower sheathing-plates 225. Their upper inwardly-bent edges 226, however, are bolted to the outer edges of horizontal plates and supporting angle-irons 226$^b$, the inner edges of said horizontal plates being secured to angle-irons 226$^c$, which are in turn riveted to the outside faces of vertical plates 226$^d$, the latter have angle-irons 227$^a$ secured to their upper edges, forming flat tops, on which are bolted the longitudinal angle-irons 228$^a$, to which latter the lower edges of the crown-sheet 230$^a$ are riveted, the crown - sheet having vertical portions 230$^b$ at its lower edges. At the forward end of the locomotive, Fig. 12$^b$, is the smoke-box cylinder 290, with its head secured to the ends of the sheathing by means of interior angle-irons 232 and 233 and outside lapped plate 234, (which, as shown in Fig. 1, extends around the upper half of the cylinder,) and at the bottom by an angle-iron 235, secured to the base 84 of the front strut F F, and an outside flange 235$^a$, extending around the lower half and formed on a plate 235$^b$, Fig. 10, covering the front of the strut F F below the smoke-box cylinder. Beneath the boiler and between the smoke-box and fire-box the sheathing consists of an angle and sheet iron quadrangular structure secured to and supported by the main and intermediate frames. The upright sheathing-plate 236, Fig. 12$^b$, at the front end is secured to the angle-iron 235 and another angle-iron 237, attached to the cross-bar 92 and extending between the plate-posts 85. It may be provided with an aperture through which the end of the lower header can be reached and with another aperture through which the front blow-off pipe 184 projects. The lower sheathing-plate comprises a portion 238 between the posts 85, secured to angle or Z bars 239, depending, as shown in Fig. 8, from the flanges 86 of the posts 85 and having thick edges to which the plate 238 is bolted or otherwise secured. The plate 238 extends forward to the line where it meets the pendent sheathing 236 in front of the fore part of the lower header, and its rear edge 240 projects just beyond the edges of the posts 85, where the remaining piece 241 of the lower sheathing - plate is conveniently secured. This bottom portion 241, Figs. 12$^a$ and 15, extends rearwardly from the edge 240 above described, between the upper chords 2 of the side members of the main frame, and is removably secured at its side edges, as by bolts, to angle-plates 242, similar to those, 239, sustaining the plate 238. Its rear edge is secured to the lower forwardly-extending flange 243, Fig. 12, formed on the end piece 244 of the quadrangular sheathing structure, the upper flange 245 being bolted to the angle-iron 60 of the middle strut D D. An aperture covered by a plate 246 is provided in said end piece to afford access to the interior, the blow-off pipe 184 being arranged to project through this end piece. The bottom supporting angle-irons 242 are secured to other angle-bars 247, Fig. 15, which are in turn riveted to the lower edges of plates 248. The latter form the vertical sides of this sheathing-structure and depend from the angle-bar supports 249, being secured in any desired manner at their rear ends to the middle strut D D and at their forward ends to the front strut F F adjacent to the outer vertical webs 118 of the spring-seats 117 and on a level with the angle-irons 116. Horizontal sheathing-plates 250$^a$ extend from these supporting-irons 249 to similar irons or plates 251ª, secured along the plates 10 of the side girders. As shown in Figs. 10 and 17, the front plate 235ª, flanged and secured to the smoke-box cylinder, extends over the front of the strut F F and closes this opening to the boiler, if being stopped slightly below the cylinder, as at 235°, for strengthening purposes. This completely incases the boiler and constitutes a covering for the fire-box and intermediate section, the smoke-box section being supported beyond the cylinder-casting, as shown in Figs. 1 and 12ᵇ.

The sheathing supports the outside lagging and for a portion of its longitudinal extension the interior fire-brick. At the rear end it is firmly secured to the front of the cab, as by the angle-plate 350, Fig. 12. The three sides of the cab and its roof are built up as desired and have the usual appurtenances, the cab being supported on the top cross-piece of the cradle 11 and on the truss-frame 270, Fig. 13, mounted upon the rear end of the main or truck frame and projecting over the sides thereof. The top horizontal bar 271 of the truss rests upon the upper chords 2, while the truss-braces 272 pass beneath the same and incline upward at the ends outside of the side chord to meet the ends of the horizontal bar. A bracing or filling 273 is secured between the upper and lower bars 271 272 between the chords 2 of the main frame. Other means for supporting the cab may be obviously employed.

A sheathing-frame is built up and secured to the intermediate frame for supporting the sheathing, lagging, and upper fire-brick work. This frame is constructed as follows: At the strut B B plates 351, Fig. 13, extend outwardly and upwardly and may be secured to or form continuations of the compression-plate 23 of the strut. Angle-irons 352 are riveted thereto and to the horizontal webs of the strut angle-irons 29. The outer edges of the extension-plates are provided with steps, to the vertical edges of which are secured upright angle-irons 353 on each side, Fig. 4, the lower points of the extension-plate and the angle-irons secured thereto resting upon angle-irons 18ª, which extend between the front and rear strut-braces 43 and 44, each of such angle-irons having its web riveted to the top girder angle-iron 18 and to the said braces. The step formed between the top and the bottom of the side of the extension-plate forms the means for supporting the longitudinally-extending angle-iron 227, and to the upper point of each extension-plate is secured an angle-iron 229, carrying the angle-welt or lap-plate 231. Between the inner flanges of the two plates 231 extend the transverse upwardly-curved ribs or T-irons 354. The frame thus outlined, it will be noted, defines the disposition of the sheathing-plates shown in Fig. 14 and to which said plates are secured.

At the strut D D the sheathing-frame corresponding to that just described is secured to the corners or ears 55 of the compression-plate through the instrumentality of short upright angle-bars 355, Fig. 5, which are riveted to the ears 55. To the outer webs of the bars 355 the longitudinal angle-irons 227 are secured, and to the latter the lower side plates 225 of the sheathing are riveted, as shown in Fig. 15. The upper ends have their flanges inset to accommodate the angle-irons 229, on which are bolted the lap-plates 231. In addition there are short compression-plates 356, having inclined tops shaped to conform to the curve of the crown-piece 230 of the sheathing, which short compression-plates are secured to the top angle-bars 64 of the strut by means of the short angle-bars 357. The upper edges of the short compression-plates have rearwardly-extending flanges 358, to which the crown-piece of the sheathing is secured, the short compression-plates being riveted to the depending web of the cross-ribs 354. The form of the sheathing over the intermediate section is different from that over the fire-box section.

At the strut F F wings 360, Fig. 8, are secured by angle-irons to the inclined plates 112 and have vertical irons 361 at their outer edges, to which the vertical sheathing-plate 226ᵈ is fixed. A longitudinal angle-iron 226 is riveted to this vertical plate at this strut, and the horizontal plate 226ª is carried thereby, a similar angle-iron 226ᵇ being secured to the outer edge of the plate. Short supporting-irons 362 extend from the iron 226ᵇ to the iron 226, on which the plate 226ª rests. An angle-iron 363 is secured to the plate 226ᵈ and to an angle-plate 364, riveted to the inclined plate 112. Angle-iron strut-bars 362ª extend from the top of girder 10 to the bar 226ᵇ. On the top edge of the plate 226ᵈ and supported also by the wings 360 and irons 361 are two angle-irons 227ª, as explained before, carrying a plate 228ª, to which are riveted the edges of the crown-sheet and ends of the crown-supporting ribs 354ª. These parts may be secured to the strut D D in any preferred way, as by riveting the ends of the angle-irons 226 thereto or affixing the ends of the plates 226ᵈ thereto in any desired manner.

The lagging to prevent radiation, Fig. 16, which may be of wood covered with Russia iron or other suitable material, is put over the top and side sheathing, that over the crown 300 of the middle section being held in place at the edges by bent plates 301, secured to the sheathing-plate 226ª. The side lagging 302 is supported over the plates 225 at their lower edges by angle-irons 303, secured to the girder-plates 10, the same extending up over the horizontal edge 226 of the plate, where it meets the edge of the horizontal strip 304. Over the meeting edges of the lagging 302 and 304 a lap-plate or welt 312 is placed to secure them, the strip 304 being held down at its inner edge against the crown 300 by the flanged plate 306. It will thus be seen that this lagging is removable at any part, as well as the sheathing beneath it, to permit access to the interior for repairs, the sides, top, or other parts being separably removable. When the lagging is removed, the side plates may be unbolted at the edges and the crown-sheathing at the outer irons 227$^a$. This explanation applies particularly to the intermediate section as illustrated in Fig. 16; but the lagging over the fire-box section is substantially the same and consists, Fig. 14, of the sheet 300$^a$ and the curved strip 307, held together by a suitable welt-strap 308. The vertical portion 309 is made integral with the lower side piece 310, the same being secured in place by the laps 311 312 and the lower support 303. As in the former instance, this lagging may be removed in sections for the purpose of repairs and the sheathing likewise removed. While other means could be employed, the described arrangement is deemed preferable.

Fire-brick may be employed to protect the parts in the interior, where the heat is intense. In the fire-box section this is disposed along the sides, as shown in section in Fig. 14, and comprises vertical portions 315, having the lower thick and outwardly-extending portion 316 and inclined curved portions 317, all being secured against the inside of the sheathing and its framework, before described, in any usual or desired manner. Between the drum-supporting struts in this section hollow fire-brick 318 are placed between the crown-lining 317 and the outer flanges 149 150 of the drums to prevent the products of combustion from passing above the drums. These sections of brick may all find support at their ends in the framework of the struts and in any other desired way.

The opening 53 in the strut D D, leading into the intermediate chamber, is lined with fire-brick, as indicated in Fig. 12, that at the bottom, 319, being extended over and about the upwardly and rearwardly inclined plate 79 to form the fire-box deflector or arch and finding a seat on the shelf 75 of the channel-bar 74. This lining extends forward through the opening in the strut and turns down, as at 320, Fig. 12$^a$, over the sheath or covering 80 to the plate 211. Similar brick linings 321 322 are provided for the top of the opening to cover the angle-irons 64 and adjacent plate. Such lining may also be extended over and about all the exposed parts of the framework or wherever desired.

Within the intermediate section the vertical sides 248 of the sheathing-box on each side of the lower header are lined with brick 323, Fig. 16, while the heat is confined so as to strike the tubes 142 on the lower side of the bank by means of hollow quadrangular bricks 324, resting at each side on the upper corner of the sheathing and frame 325 and against the angle-plate 326, which is supported by a plate 327, riveted to the vertical web 328 of a sheathing-bracket 328$^a$, carried by the plate 250$^a$. A horizontally-disposed layer 329 is carried by said plates 328 or by the horizontally-disposed plate 327$^a$ carried thereby, and an additional brick 330 is employed to reach over the top of the girder 10 to the side sheathing 225. Above the side headers the vertical plates 226$^d$ are extended lower than the horizontal plates 226$^a$, as at 331, and have riveted to their lower edges the inwardly-projecting angle-irons 332, which form supports for fire-brick lining above the header and tubes, such lining consisting of the hollow triangular portion 334, having the vertical wing 335. Upon this is another strip 336, following the contour of the tubes and fitting closely against the outward flanges 149 150 of the drums 124. A lining of fire-brick may also extend over the drums inside the crown-sheathing. It will be noticed that this lining about the headers and drums follows in general the curvature of the tubes and that considerable material is saved by the hollow construction of the brick. Fire-brick also may be placed about the exposed portions of the strut F, as indicated in Fig. 12$^b$, the bottom part 400 extending through the opening and down on each side, as at 401 and 402, and being slanted off, as at 403, into the smoke-box. The upper part 404 extends through and upward, as at 405, to cover the edges of the hole and framing and may extend about the whole circumference of the opening, as indicated by the numeral 406.

It will of course be understood that the described disposition of the fire-brick is by no means the only one that could be utilized, but for many purposes it is considered preferable.

The ash-pan 49 beneath the fire-box, Figs. 12, 14, and 19, comprises a rectangular box-like base or bottom 250, having vertical sides and being sufficiently narrow to fit between the side frames 273 of the truck. It is provided with end apertures having swinging doors 251 to close the same. The lower longitudinal corners of the same are formed with bars 252, grooved on their opposing faces to receive the bottom sheet 253, the side sheets and end door-frames being suitably secured thereto by means of angle-irons. The bottom of the pan is arched at 254 to raise it out of possible contact with the axle, and at its forward end a hole 255 is provided with a sliding cover 256 therefor. Access to the pan for any purpose may thus be had at either end or through the aperture 255. This box is supported from the rear and intermediate struts and the side girders of the intermediate frame and receives the ashes from the whole grate area by the flaring or funnel-like sides 257 and corresponding ends 258, which are secured by angle-plates 259 to the edges of the box and by similar plates 260 to the flanges 261 of the depending vertical webs 262 of the grate-supporting bars 262$^a$, which are secured to the side girders 10. The front end 258 is riveted at its upper edge to the angle-plate 78, bolted, as before described, to flange 77 of the transverse channel-casting 74 of the strut D D. The rear plate 258 is secured to the flanged iron 48, which is shown bolted to the channel-bar 45. The latter plate has apertures covered by the sliding plates 263 to provide admission to the ash-pan from the rear through holes 24 in the transverse plate of the rear strut B B. The flaring sides 257 and ends 258 are tied together by corner angle-bars, so as to make a strong construction throughout. Boxes 257$^a$, Fig. 14, are built up, as shown, in the sides 257 of the ash-pan to provide room for the drive-wheels 6.

The grate 264$^a$, which may be of the usual construction and provided with the usual dumping levers and rods extending to the rear and adapted to be operated from the cab, comprises four sections, which are supported at the sides on a projecting ledge 264 of the box and on channel-castings 264$^a$, secured to the side girders 10 immediately beneath the vertical web of the angle-irons 18. At the center a longitudinal bar 265 extends the length of the fire-box and is supported at its ends upon the framework in any desired manner, the grate-bar resting upon the horizontal webs 266 of said bar. The sections are separated transversely by a beam 265$^a$, located about midway of the box and secured at its ends to the framework by any suitable means. As shown, the grates are located above the drive-wheels of the locomotive and extend from side to side of the intermediate frame. They are also above the plane of the lower header 141. Filling or other bars 265$^b$ are placed in front and rear of the grate.

The stoke-doors 280, Fig. 12, which are used to close the openings 25, are practically segments of spheres of appropriate size having outwardly-bent or flat circular flanges adapted to fit closely against the flat rings at the edges of the holes in the plate 23. Suitable hinges are provided for the same at one side of the opening, and a catch is provided at the other, with which a latch on the door engages. The curved portions of said doors may be provided with openings 282, which may be closed by a plate 285 of suitable form fitting closely over the outside of said portion and adapted to be turned by a handle 284 to open or close the same. Disk or other deflector 285 may also be provided and supported on the door by a standard 286. Through these doors coals may be thrown to any part of the grate.

The smoke-box cylinder 290, Fig. 12$^b$, as explained above, is supported from the lower strut angle-iron 235 and the upper lagging-frame angle-bar 232. It has secured thereto a circular end 291, bulged outward at the center in the usual way. A smoke-stack 292 is carried by the smoke-box cylinder and is secured thereto by the circular angular plate or flanged collar 293, a hood 294 being located and supported in any desired way beneath the smoke-stack and having a flaring inverted funnel end 295 above the exhaust-tubes 296, which project up from the cylinder-castings 125$^a$ and are connected, of course, with the exhaust-ports of the working cylinders. In this position of the hood the exhaust-steam is directed up the smoke-stack, and the products of combustion can pass out above the hood, and thus circulate around the throttle-box, pipe 129, and horizontal portions of pipes 132.

As shown in Figs. 12$^b$ and 13, the plate 235$^b$, having the flange 235$^a$, assists in supporting the cylinder 290. The plate 95 of the strut F F may be extended, as shown in Fig. 17, over the whole area of the smoke-box 290, the drums 124 and pipe 126 projecting through the upper portion.

The branch pipes 132, Fig. 17, leading from the throttle-box 131 to the working cylinders 133, first extend horizontally from each end of the throttle-box, then curve down and follow along the inside contour of the smoke-box to the proper openings in the cylinder-castings. The means for operating the throttle consists of a bell-crank lever 297, properly supported and connected at one end with the throttle-valve rod or stem 298. Any suitable means may be provided to operate the lever 297 from the cab. This disposition of the various parts in the smoke-box causes a strong draft to aid in combustion and keeps the steam fed to the cylinders in a superheated and dry condition.

It will be obvious that some of the details of construction and arrangement may be varied without departing from the spirit of the invention, and also that some of the features are capable of application independently of other features, and that the invention, therefore, is not restrained to a structure in which all of the features of improvement are combined.

I claim as my invention—

1. In a steam-generator, the combination of a pair of drums, side headers placed beneath and at the sides of the same, an intermediate header located below the pair of drums and headers, and supports for the drums and headers permitting relative movement thereof to allow of longitudinal expansion and contraction, the supports for the intermediate header also permitting vertical movement of said header.

2. In a steam-generating device, the combination of a pair of main drums, side headers, a third header, tubes connecting said drums and headers and spring-supports for the last-named header to allow for the expansion and contraction of its connecting-tubes.

3. In a steam-generating device, the combination of a drum, a side header, a second header, tubes connecting the drum with the said headers, and spring-supports for the last-named header to allow for the expansion and contraction of its connecting-tubes.

4. In a steam-generator, the combination of a pair of drums, side headers placed beneath and at the sides of the same, a third header located below the pair of drums and beneath the plane of the side headers, tubes connecting each drum with one side header and with the lower header, and spring-supports for the last-named header to allow for the expansion and contraction of its connecting-tubes.

5. In a steam-generator, the combination of a drum, a header, tubes connecting the drum with the header, and spring-supports for the header to allow for the expansion and contraction of its connecting-tubes.

6. In a steam-generator, the combination of a drum, a header placed at the side of and beneath the drum, another header below the plane of the side header, substantially S-shaped tubes connecting said drums and side headers in one section of the system, substantially L-shaped tubes connecting the same parts in another section, and substantially vertical tubes between the drum and the lower header in the last-named section.

7. In a steam-generator, the combination of a pair of main drums connected above the water-line, side headers, one on each side of said drums and beneath the same, another header directly beneath the drums and below the plane of the side headers, and tubes extending from the lower halves of the drums to the inner sides of the side headers and the top of the lower header.

8. In a steam-generator, the combination of a pair of main drums, side headers, one on each side of said drums and below the same, a third header directly beneath the drum and below the plane of the side headers, and tubes interconnecting said drums and headers, the side headers being flexibly mounted for longitudinal expansion and contraction, and the lower header for longitudinal expansion and contraction and for vertical movement.

9. In a steam-generator, the combination of a pair of drums, a header parallel with and below the drums, tubes interconnecting them, means for supporting an end of each of said drums and said header with freedom for longitudinal movement to allow for longitudinal expansion and contraction, and a yielding support for one of said parts to permit movement in a vertical direction and allow for the expansion and contraction of the tubes.

10. In a steam-generator, the combination of a pair of drums, a header, tubes extending between said drums and header, and means independent of the tubes for yieldingly supporting one of said connected parts, to allow for expansion and contraction of the tubes while relieving the tubes of the weight of the suspended parts.

11. In a steam-generator, the combination of a pair of drums, side headers, a lower header, tubes connecting the said drums and headers, a sectional inclosure for the whole system, and means for detachably securing together the sections of the inclosure whereby said inclosure may be removed in sections adjacent to the drums and headers.

12. In a steam-generator comprising a fire-box section and a forward section, the combination of a pair of drums, side headers, a lower header, tubes connecting said drums and headers in the fire-box section, said tubes leading substantially horizontally away from the drums, then vertically down to the said headers to provide room in the fire-box, and tubes in the forward section between the headers and drums and extending substantially vertically down from said drums, to substantially fill the space through which the products of combustion pass.

13. In a steam-generator, a drum, a header beneath and at the side of the same, tubes running down from the drum and then sidewise to the header, a covering for the whole seated upon a suitable framework, a projecting ledge being formed on a downward extension of said covering or framework, and a fire-brick lining for said covering supported by said projecting ledge.

14. In a steam-generator, a pair of drums, headers at each side beneath the same, another header lower than the side headers and beneath the drums, a substantially vertical bank of tubes between the drums and lower header, another bank of tubes bending substantially at right angles and extending between the drums and side headers, a sheathing or covering for the system, a fire-brick lining for the sheathing at the sides of the vertical tubes, and above and below the substantially horizontal portions of the tubes, and means for supporting the said lining.

15. In a steam-generator, the combination of drums, side headers, and interconnecting tubes, the longitudinal space beneath the drums having horizontal outwardly-extending spaces where the side headers are located, and the tubes extending across the spaces and being closer in the middle than at the sides.

16. In a steam-generator, the combination of a header, tubes connected therewith, a rigid support for the header at one end, and a knuckle-joint support at the other to allow for expansion and contraction of the same.

17. In a steam-generator, the combination of a header, tubes connected therewith, a rigid support for the header at one end, and knuckle-joint supports at the middle and at the other end.

18. In a steam-generator, the combination of a header, tubes connected therewith, and springs independent of the header to support the header and relieve the tubes.

19. In a steam-generator, the combination of a header, tubes connected with one side thereof, spring-supports at one end of the header, and link-supports at the other end thereof.

20. In a steam-generator, the combination of a header, a frame, coöperating guides on the header and frame to provide for longitudinal movement therebetween, and flexible spring-supports between the frame and the header.

21. In a steam-generator, the combination of a header, tubes connected therewith, a frame and spring-supported swing-links to suspend the header from the frame.

22. In a steam-generator, the combination of a header, a frame, coöperating guides at one end of the header and on the frame to provide for vertical movement of the header, other guides at the other end of the header and on the frame to provide for longitudinal movement therebetween, spring-supports at the former end of the header, and spring-supported links at the other end of the header.

23. In a steam-generator, the combination of a drum a dry-pipe connected to the upper half of the drum, a covering over the whole, the upper half of said drum and the dry-pipe being removable, and means to close the opening between the sides of the drum and the covering to form a chamber inclosing the dry-pipe, the covering over the drum being removable.

This specification signed and witnessed this 1st day of March, A. D. 1902.

CORNELIUS VANDERBILT.

In presence of—
WILLIAM W. CLOUSER,
LOUIS A. SHEPARD.